(12) United States Patent
Chen et al.

(10) Patent No.: US 12,436,653 B2
(45) Date of Patent: Oct. 7, 2025

(54) TOUCH CONTROL STRUCTURE, TOUCH DISPLAY PANEL AND ELECTRONIC DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Tianci Chen, Beijing (CN); Chang Luo, Beijing (CN); Yi Zhang, Beijing (CN); Ping Wen, Beijing (CN); Yang Zeng, Beijing (CN); Wei Wang, Beijing (CN); Yu Wang, Beijing (CN); Siyu Wang, Beijing (CN); Junxiu Dai, Beijing (CN); Song Liu, Beijing (CN)

(73) Assignees: CHENGDUU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/558,297

(22) PCT Filed: Oct. 31, 2022

(86) PCT No.: PCT/CN2022/128621
§ 371 (c)(1),
(2) Date: Oct. 31, 2023

(87) PCT Pub. No.: WO2024/092405
PCT Pub. Date: May 10, 2024

(65) Prior Publication Data
US 2025/0094006 A1      Mar. 20, 2025

(51) Int. Cl.
*G06F 3/044* (2006.01)
*G06F 3/041* (2006.01)
*H10K 59/40* (2023.01)

(52) U.S. Cl.
CPC ........ *G06F 3/0446* (2019.05); *G06F 3/04164* (2019.05); *G06F 2203/04111* (2013.01); *H10K 59/40* (2023.02)

(58) Field of Classification Search
CPC ............... G06F 3/0446; G06F 3/04164; G06F 2203/04111; H10K 59/40
See application file for complete search history.

(56) References Cited

U.S. PATENT DOCUMENTS

2018/0143720 A1*   5/2018   Kim ..................... G09G 3/3225
2019/0058027 A1    2/2019   Kim et al.
(Continued)

FOREIGN PATENT DOCUMENTS

| CN | 110471568 A | 11/2019 |
| WO | 2022/121456 A1 | 6/2022 |

*Primary Examiner* — Lunyi Lao
*Assistant Examiner* — Sarvesh J Nadkarni
(74) *Attorney, Agent, or Firm* — LEASON ELLIS LLP

(57) ABSTRACT

A touch control structure, a touch display panel and an electronic device are provided. The touch control structure includes: a first metal layer and a second metal layer stacked on the base substrate, an insulating layer between the first metal layer and the second metal layer, the first metal layer includes a plurality of first touch sub-electrodes arranged along a first direction and spaced apart from each other, a plurality of second touch sub-electrodes and a plurality of connection electrodes which are arranged along a second direction, the plurality of first touch sub-electrodes and the plurality of second touch sub-electrodes are spaced apart from each other; the second metal layer includes a plurality of bridge electrodes spaced apart from each other, each of the plurality of bridge electrodes is electrically connected (Continued)

with two adjacent first touch sub-electrodes through a plurality of via structures in the insulating layer.

19 Claims, 9 Drawing Sheets

(56) References Cited

U.S. PATENT DOCUMENTS

| | | |
|---|---|---|
| 2021/0048925 A1 | 2/2021 | Wang et al. |
| 2021/0089165 A1 | 3/2021 | Ren et al. |
| 2022/0187952 A1 | 6/2022 | Lin et al. |
| 2022/0229514 A1* | 7/2022 | Park .................... H10K 50/844 |
| 2022/0391042 A1 | 12/2022 | Xiang et al. |
| 2023/0023671 A1* | 1/2023 | Shim .................... G06F 3/0321 |
| 2023/0214035 A1* | 7/2023 | Song .................... G06F 3/0412 |
| | | 345/173 |
| 2024/0256094 A1* | 8/2024 | Zhang .................. G06F 3/0443 |

* cited by examiner

TOUCH CONTROL STRUCTURE, TOUCH DISPLAY PANEL AND ELECTRONIC DEVICE

CROSS-REFERENCE TO RELATED PATENT APPLICATIONS

This application is a U.S. National Stage Application under 35 U.S.C. § 371 of International Patent Application No. PCT/CN2022/128621, filed Oct. 31, 2022, which is incorporated by reference in its entirety.

TECHNICAL FIELD

Embodiments of the present disclosure relates to a touch control structure, a touch display panel and an electronic device.

BACKGROUND

Active matrix organic light emitting diode (AMOLED) display technology has been developed rapidly, and the touch control technical solution combined with AMOLED is also developing rapidly. At present, the touch technology with AMOLED display screen mainly includes an Add-on-Type touch film bonding technology and an On-Cell technology which integrates touch elements on the surface of the display panel, so that the integrated display panel itself has the touch function.

User interfaces with touch function are widely used in various electronic devices. For example, the setting of touch electrode structure is an important factor affecting user experience. For example, in a touch display device, a touch panel is disposed above the display panel to generate an input signal when a user touches the touch panel. Input signals generated in the touch panel are provided to the display panel, and the display panel provides images corresponding to the input signals in response to the input signals received from the touch panel.

SUMMARY

At least one embodiment of the present disclosure provides a touch control structure, a touch display panel and an electronic device. In the touch control structure, at least in the middle area, the plurality of bridge electrodes include a first bridge electrode and a second bridge electrode which are adjacent to each other, and two adjacent first touch sub-electrodes connected with the first bridge electrodes are a first group of touch sub-electrodes, and two adjacent first touch sub-electrodes connected with the second bridge electrodes are a second group of touch sub-electrodes. The first group of touch sub-electrodes and the second group of touch sub-electrodes are different sub-electrodes, and the extension directions of the first bridge electrode and the second bridge electrode which are adjacent to each other intersect with each other. This design can reduce the capacitance value of the electronic device including the touch control structure, and the extension directions of the two adjacent bridge electrodes in the middle area intersect each other and are symmetrical, which can also prevent the phenomenon of vanishing to some extent.

At least one embodiment of the present disclosure provides a touch control structure, and the touch control structure includes: a base substrate; and a first metal layer and a second metal layer stacked on the base substrate, and an insulating layer sandwiched between the first metal layer and the second metal layer, the first metal layer comprises a plurality of first touch sub-electrodes sequentially arranged along a first direction and spaced apart from each other, and a plurality of second touch sub-electrodes and a plurality of connection electrodes which are sequentially arranged along a second direction, the first direction intersects with the second direction, and the plurality of first touch sub-electrodes and the plurality of second touch sub-electrodes are spaced apart from each other; the second metal layer comprises a plurality of bridge electrodes spaced apart from each other, and each of the plurality of bridge electrodes is electrically connected with two adjacent first touch sub-electrodes through a plurality of via structures in the insulating layer, so as to electrically connect any adjacent first touch sub-electrodes to form a first touch electrode extending in the first direction; the plurality of second touch sub-electrodes and the plurality of connection electrodes are alternately arranged one by one and electrically connected in sequence to form a second touch electrode extending along the second direction; an orthographic projection of each of the plurality of bridge electrodes on the base substrate is overlapped with an orthographic projection of a corresponding connection electrode on the base substrate; on a plane parallel to a main surface of the base substrate, the touch control structure is divided into a middle area and a peripheral area surrounding the middle area, at least in the middle area, the plurality of bridge electrodes comprise a first bridge electrode and a second bridge electrode which are adjacent to each other, and the two adjacent first touch sub-electrodes connected with the first bridge electrode are a first group of touch sub-electrodes, the two adjacent first touch sub-electrodes connected with the second bridge electrode are a second group of touch sub-electrodes, the first group of touch sub-electrodes and the second group of touch sub-electrodes are different touch sub-electrodes, and extension directions of the first bridge electrode and the second bridge electrode which are adjacent to each other intersect with each other.

For example, in the touch control structure provided by at least one embodiment of the present disclosure, the first bridge electrode and the second bridge electrode which are adjacent in the first direction are symmetrical about a straight line extending in the second direction.

For example, in the touch control structure provided by at least one embodiment of the present disclosure, the first bridge electrode and the second bridge electrode which are adjacent in the second direction are symmetrical about a straight line extending in the first direction.

For example, in the touch control structure provided by at least one embodiment of the present disclosure, each of the plurality of bridge electrodes and each of the plurality of connection electrodes extend substantially along a straight line, and an extension direction of each of the plurality of bridge electrodes is perpendicular to an extension direction of a corresponding connection electrode.

For example, in the touch control structure provided by at least one embodiment of the present disclosure, in the middle area, the extension directions of the first bridge electrode and the second bridge electrode which are adjacent to each other are perpendicular to each other.

For example, in the touch control structure provided by at least one embodiment of the present disclosure, the first metal layer comprises a plurality of first metal grids defined by a plurality of first metal lines and a plurality of second metal lines intersecting with each other, and each of the plurality of first metal grids has a quadrilateral shape, and each of the plurality of first touch sub-electrodes comprises multiple first metal grids in the plurality of first metal grids and each of the second touch sub-electrodes comprises multiple first metal grids in the plurality of first metal grids; in the middle area, extension directions of the plurality of first metal lines are all parallel to the extension direction of the first bridge electrode, and the extension directions of the plurality of second metal lines are all parallel to the extension direction of the second bridge electrode, or the extension directions of the first metal lines are all parallel to the extension direction of the second bridge electrode, and the extension directions of the plurality of second metal lines are all parallel to the extension direction of the first bridge electrode.

For example, in the touch control structure provided by at least one embodiment of the present disclosure, the plurality of via structures comprise a first via structure and a second via structure which are oppositely arranged in the extension direction of each of the plurality of bridge electrodes; the first touch sub-electrode located at a first end of each of the plurality of bridge electrodes is electrically connected with a corresponding bridge electrode through the first via structure, and the first touch sub-electrode located at a second end of each of the plurality of bridge electrodes is electrically connected with the corresponding bridge electrode through the second via structure, and the first end and the second end of each of the plurality of bridge electrodes are opposite ends along the extension direction of the corresponding bridge electrode, such that the first touch sub-electrode located at the first end of each of the plurality of bridge electrodes and the first touch sub-electrode located at the second end of the corresponding bridge electrode are electrically connected.

For example, in the touch control structure provided by at least one embodiment of the present disclosure, the plurality of via structures comprise at least two groups of first via structures and second via structures which are oppositely arranged in the extension direction of each of the plurality of bridge electrodes; each of the plurality of bridge electrodes comprises a first part and a second part which extend in parallel and are spaced apart from each other, and both the first part and the second part are electrically connected with the first touch sub-electrode at the first end of the corresponding bridge electrode through the first via structures, and both the first part and the second part are electrically connected with the first touch sub-electrode at the second end of the corresponding bridge electrode through the second via structures.

For example, in the touch control structure provided by at least one embodiment of the present disclosure, the plurality of via structures comprise four groups of first via structures and second via structures which are oppositely arranged in the extension direction of each of the plurality of bridge electrodes; both the first part and the second part are electrically connected with the first touch sub-electrode at the first end of the corresponding bridge electrode through two corresponding first via structures; both the first part and the second part are electrically connected with the first touch sub-electrode at the second end of the corresponding bridge electrode through two corresponding second via structures.

For example, in the touch control structure provided by at least one embodiment of the present disclosure, the orthographic projection of each of the plurality of bridge electrodes on the base substrate is partially overlapped with orthographic projections of the first touch sub-electrodes connected to both ends of each of the plurality of bridge electrode on the base substrate.

For example, in the touch control structure provided by at least one embodiment of the present disclosure, in the middle area, the extension directions of the plurality of first metal lines in the first metal layer are all parallel to the extension direction of the second bridge electrode, and the extension directions of the plurality of second metal lines in the first metal layer are all parallel to the extension direction of the first bridge electrode; four first via structures at the first side of the first bridge electrode in the extension direction of the first bridge electrode are connected in sequence to form a first quadrilateral shape, and the first quadrilateral shape is at an edge position of a corresponding first touch sub-electrode; the plurality of connection electrodes comprise a first connection electrode corresponding to and intersecting with the first bridge electrode, the first quadrilateral shape comprises a first edge and a second edge which are connected with each other, the first quadrilateral shape comprises one first edge and two second edges, and the first edge is formed by connecting two first via structures which are closest to the first connection electrode among the four first via structures at the first side, the first edge is parallel to the extension directions of the plurality of first metal lines, the two second edges are two edges connected with the first edge, the second edge is parallel to the extension directions of the plurality of second metal lines, and the first metal line corresponding to the first edge is disconnected at both ends.

For example, in the touch control structure provided by at least one embodiment of the present disclosure, four second via structures at the second side of the first bridge electrode in the extension direction of the first bridge electrode are connected in sequence to form a second quadrilateral shape, the first side and the second side are two opposite sides in the extension direction of the first bridge electrode, and the second quadrilateral shape is at an edge position of a corresponding first touch sub-electrode; the second quadrilateral shape comprises a third edge and a fourth edge which are connected with each other, the second quadrilateral shape comprises one third edge and two fourth edges, and the third edge is formed by connecting two second via structures which are closest to the first connection electrode among the four second via structures at the second side; the third edge is parallel to the extension directions of the plurality of first metal lines, and the two fourth sides are two edges connected with the third edge, the fourth edge is parallel to the extension directions of the plurality of second metal lines, and the first metal line corresponding to the third edge is disconnected at both ends.

For example, in the touch control structure provided by at least one embodiment of the present disclosure, the second metal layer comprises a plurality of second metal grids defined by a plurality of third metal lines and a plurality of fourth metal lines intersecting with each other, extension directions of the plurality of third metal lines are parallel to the extension directions of the plurality of first metal lines, and the extension directions of the plurality of fourth metal lines are parallel to the extension directions of the plurality of second metal lines, and each of the plurality of second metal grids has a quadrilateral shape.

For example, in the touch control structure provided by at least one embodiment of the present disclosure, a width of a first metal line corresponding to the first edge and the third edge in the extension direction of the first bridge electrode is equal to a width of other positions of the first metal line in the extension direction of the first bridge electrode; a width of a third metal line corresponding to the first edge and the third edge in the extension direction of the first bridge electrode is equal to a width of other positions of the third metal line in the extension direction of the first bridge electrode, and an edge of the first metal line corresponding to the first edge at a side close to a center of the first quadrilateral shape is closer to the center of the first quadrilateral shape than an edge of the third metal line corresponding to the first edge at a side close to the center of the first quadrilateral shape, and an orthographic projection of the first metal line corresponding to the first edge on the base substrate and an orthographic projection of the third metal line corresponding to the first edge on the base substrate are at least partially not overlapped with each other; an edge of the first metal line corresponding to the third edge at a side close to a center of the second quadrilateral is closer to the center of the second quadrilateral than an edge of the third metal line corresponding to the third edge at a side close to the center of the second quadrilateral, and an orthographic projection of the first metal line corresponding to the third edge on the base substrate and an orthographic projection of the third metal line corresponding to the third edge on the base substrate are at least partially not overlapped with each other.

For example, in the touch control structure provided by at least one embodiment of the present disclosure, a width of the second metal line corresponding to the second edge and the fourth edge in the extension direction of the first connection electrode intersecting with the first bridge electrode is equal to a width of other positions of the second metal line in the extension direction of the first connection electrode; a width of the fourth metal line corresponding to the second edge and the fourth edge in the extension direction of the first connection electrode intersecting with the first bridge electrode is equal to a width of other positions of the fourth metal line in the extension direction of the first connection electrode, and an edge of the second metal line corresponding to the second edge at a side close to a center of the first quadrilateral shape is closer to the center of the first quadrilateral shape than an edge of the fourth metal line corresponding to the second edge at a side close to the center of the first quadrilateral shape, and an orthographic projection of the second metal line corresponding to the second edge on the base substrate and an orthographic projection of the fourth metal line corresponding to the second edge on the base substrate are at least partially not overlapped with each other; an edge of the second metal line corresponding to the fourth edge at a side close to a center of the second quadrilateral shape is closer to the center of the second quadrilateral shape than an edge of the fourth metal line corresponding to the fourth edge at a side close to the center of the second quadrilateral shape, and an orthographic projection of the second metal line corresponding to the fourth edge on the base substrate and an orthographic projection of the fourth metal line corresponding to the fourth edge on the base substrate are at least partially not overlapped with each other.

For example, in the touch control structure provided by at least one embodiment of the present disclosure, on the plane parallel to the main surface of the base substrate and in the extension direction of the first bridge electrode, a distance between the edge of the first metal line at a side close to the center of the first quadrilateral shape corresponding to the first edge and the edge of the third metal line at a side close to the center of the first quadrilateral shape corresponding to the first edge ranges from 1 µm to 1.4 µm; in the extension direction of the first bridge electrode, a distance between the edge of the first metal line at a side close to the center of the second quadrilateral shape corresponding to the third edge and the edge of the third metal line at a side close to the center of the second quadrilateral shape corresponding to the third edge ranges from 1 µm to 1.4 µm.

For example, in the touch control structure provided by at least one embodiment of the present disclosure, on the plane parallel to the main surface of the base substrate, a distance between the edge of the second metal line corresponding to the second edge at a side close to the center of the first quadrilateral shape and the edge of the fourth metal line corresponding to the second edge at a side close to the center of the first quadrilateral shape in the extension direction of the first connection electrode ranges from 1 µm to 1.4 µm; a distance between the edge of the second metal line corresponding to the fourth edge at a side close to the center of the second quadrilateral shape and the edge of the fourth metal line corresponding to the fourth edge at a side close to the center of the second quadrilateral shape in the extension direction of the first connection electrode ranges from 1 µm to 1.4 µm.

For example, in the touch control structure provided by at least one embodiment of the present disclosure, the first bridge electrode and the first connection electrode intersect to form a plurality of first overlapping parts, at the positions corresponding to the first overlapping parts, the orthographic projection of the part corresponding to the first metal layer on the base substrate is smaller than the orthographic projection of the part corresponding to the second metal layer on the base substrate, and the orthographic projection of the part corresponding to the first metal layer on the base substrate is within the orthographic projection of the part corresponding to the second metal layer on the base substrate.

For example, in the touch control structure provided by at least one embodiment of the present disclosure, the first bridge electrode and the first connection electrode intersect to form four first overlapping parts, and the four first overlapping parts are sequentially connected in a clockwise direction to form a fifth quadrilateral shape.

For example, in the touch control structure provided by at least one embodiment of the present disclosure, four first via structures at the first side of the second bridge electrode in the extension direction of the second bridge electrode are connected in sequence to form a third quadrilateral shape, and the third quadrilateral shape is at an edge position of a corresponding first touch sub-electrode; the plurality of connection electrodes comprise a second connection electrode corresponding to and intersecting with the second bridge electrode, the third quadrilateral shape comprises a fifth edge and a sixth edge which are connected with each other, the third quadrilateral shape comprises one fifth edge and two sixth edges, and the fifth edge is formed by connecting two first via structures which are closest to the second connection electrode among the four first via structures at the first side, the fifth edge is parallel to the extension directions of the plurality of second metal lines, the two sixth edges are two edges connected with the fifth edge, the sixth edge is parallel to the extension directions of the plurality of first metal lines, and the second metal line corresponding to the fifth edge is disconnected at both ends.

For example, in the touch control structure provided by at least one embodiment of the present disclosure, four second via structures at the second side of the second bridge electrode in the extension direction of the second bridge electrode are connected in sequence to form a fourth quadrilateral shape, the first side and the second side are two opposite sides in the extension direction of the second bridge electrode, and the fourth quadrilateral shape is at an edge position of a corresponding first touch sub-electrode; the fourth quadrilateral shape comprises a seventh edge and an eighth edge which are connected with each other, the fourth quadrilateral shape comprises one seventh edge and two eighth edges, and the seventh edge is formed by connecting two second via structures which are closest to the second connection electrode among the four second via structures at the second side, the seventh edge is parallel to the extension directions of the plurality of second metal lines, and the two eighth edges are two edges connected with the seventh edge, the eighth edge is parallel to the extension directions of the plurality of first metal lines, and the second metal line corresponding to the seventh edge is disconnected at both ends.

For example, in the touch control structure provided by at least one embodiment of the present disclosure, the second metal layer comprises a plurality of second metal grids defined by a plurality of third metal lines and a plurality of fourth metal lines intersecting with each other, extension directions of the plurality of third metal lines are parallel to the extension directions of the plurality of first metal lines, and the extension directions of the plurality of fourth metal lines are parallel to the extension directions of the plurality of second metal lines, and each of the plurality of second metal grids has a quadrilateral shape.

For example, in the touch control structure provided by at least one embodiment of the present disclosure, a width of a second metal line corresponding to the fifth edge and the seventh edge in the extension direction of the second bridge electrode is equal to a width of other positions of the second metal line in the extension direction of the second bridge electrode; a width of a fourth metal line corresponding to the fifth edge and the seventh edge in the extension direction of the second bridge electrode is equal to a width of other positions of the fourth metal line in the extension direction of the second bridge electrode, and an edge of the second metal line corresponding to the fifth edge at a side close to a center of the third quadrilateral shape is closer to the center of the third quadrilateral shape than an edge of the fourth metal line corresponding to the fifth edge at a side close to the center of the third quadrilateral shape, and an orthographic projection of the second metal line corresponding to the fifth edge on the base substrate and an orthographic projection of the fourth metal line corresponding to the fifth edge on the base substrate are at least partially not overlapped with each other; an edge of the second metal line corresponding to the seventh edge at a side close to a center of the fourth quadrilateral shape is closer to the center of the fourth quadrilateral shape than an edge of the fourth metal line corresponding to the seventh edge at a side close to the center of the fourth quadrilateral shape, and an orthographic projection of the second metal line corresponding to the seventh edge on the base substrate and an orthographic projection of the fourth metal line corresponding to the seventh edge on the base substrate are at least partially not overlapped with each other.

For example, in the touch control structure provided by at least one embodiment of the present disclosure, a width of the first metal line corresponding to the sixth edge and the eighth edge in the extension direction of the second connection electrode intersecting with the second bridge electrode is equal to a width of other positions of the first metal line in the extension direction of the second connection electrode; a width of the third metal line corresponding to the sixth edge and the eighth edge in the extension direction of the second connection electrode intersecting with the second bridge electrode is equal to a width of other positions of the third metal line in the extension direction of the second connection electrode, and an edge of the first metal line corresponding to the sixth edge at a side close to a center of the third quadrilateral shape is closer to the center of the third quadrilateral shape than an edge of the third metal line corresponding to the sixth edge at a side close to the center of the third quadrilateral shape, and an orthographic projection of the first metal line corresponding to the sixth edge on the base substrate and an orthographic projection of the third metal line corresponding to the sixth edge on the base substrate are at least partially not overlapped with each other; an edge of the first metal line corresponding to the eighth edge at a side close to a center of the fourth quadrilateral shape is closer to the center of the fourth quadrilateral shape than an edge of the third metal line corresponding to the eighth edge at a side close to the center of the fourth quadrilateral shape, and an orthographic projection of the first metal line corresponding to the eighth edge on the base substrate and an orthographic projection of the third metal line corresponding to the eighth edge on the base substrate are at least partially not overlapped with each other.

For example, in the touch control structure provided by at least one embodiment of the present disclosure, on the plane parallel to the main surface of the base substrate and in the extension direction of the second bridge electrode, a distance between the edge of the second metal line at a side close to the center of the third quadrilateral shape corresponding to the fifth edge and the edge of the fourth metal line at a side close to the center of the third quadrilateral shape corresponding to the fifth edge ranges from 1 μm to 1.4 μm; in the extension direction of the second bridge electrode, a distance between the edge of the second metal line at a side close to the center of the fourth quadrilateral shape corresponding to the seventh edge and the edge of the fourth metal line at a side close to the center of the fourth quadrilateral shape corresponding to the seventh edge ranges from 1 μm to 1.4 μm.

For example, in the touch control structure provided by at least one embodiment of the present disclosure, on the plane parallel to the main surface of the base substrate, a distance between the edge of the first metal line corresponding to the sixth edge close to the center of the third quadrilateral shape and the edge of the third metal line corresponding to the sixth edge at a side close to the center of the third quadrilateral shape in the extension direction of the second connection electrode ranges from 1 μm to 1.4 μm; a distance between the edge of the first metal line corresponding to the eighth edge at a side close to the center of the fourth quadrilateral shape and the edge of the third metal line corresponding to the eighth edge at a side close to the center of the fourth quadrilateral shape in the extension direction of the second connection electrode ranges from 1 μm to 1.4 μm.

For example, in the touch control structure provided by at least one embodiment of the present disclosure, the second bridge electrode and the second connection electrode intersect to form a plurality of second overlapping parts, an orthographic projection of a part corresponding to the first metal layer on the base substrate is smaller than an orthographic projection of a part corresponding to the second metal layer on the base substrate, and the orthographic projection of the part corresponding to the first metal layer on the base substrate is within the orthographic projection of the part corresponding to the second metal layer on the base substrate.

For example, in the touch control structure provided by at least one embodiment of the present disclosure, the second bridge electrode and the second connection electrode intersect to form four second overlapping parts, and the four second overlapping parts are sequentially connected in a clockwise direction to form a sixth quadrilateral shape.

For example, in the touch control structure provided by at least one embodiment of the present disclosure, a same side of the peripheral area comprises a plurality of bridge electrodes, and the plurality of bridge electrodes comprise a third bridge electrode and a fourth bridge electrode which are adjacent to each other, and extension directions of the third bridge electrode and the fourth bridge electrode are the same.

For example, in the touch control structure provided by at least one embodiment of the present disclosure, the extension directions of the plurality of first metal lines in the middle area are all parallel to the extension direction of the first bridge electrode, and the extension directions of the plurality of second metal lines are all parallel to the extension direction of the second bridge electrode; or, the extension directions of the plurality of first metal lines are all parallel to the extension direction of the first connection electrode, and the extension directions of the plurality of second metal lines are all parallel to the extension direction of the second connection electrode.

For example, in the touch control structure provided by at least one embodiment of the present disclosure, a same side of the peripheral area comprises one bridge electrode, and the bridge electrode is a third bridge electrode, and an extension direction of the third bridge electrode is the same as an extension direction of a bridge electrode which is closest to the third bridge electrode in the middle area.

For example, in the touch control structure provided by at least one embodiment of the present disclosure, a floating electrode is arranged between the plurality of first touch sub-electrodes and the plurality of second touch sub-electrodes which are spaced apart from each other, and the floating electrode is electrically insulated from the plurality of first touch sub-electrodes and the plurality of second touch sub-electrodes.

At least one embodiment of the present disclosure further provides another touch control structure, and the touch control structure includes: a base substrate; a first metal layer and a second metal layer stacked on the base substrate, and an insulating layer sandwiched between the first metal layer and the second metal layer, the first metal layer comprises a plurality of first touch sub-electrodes sequentially arranged along a first direction and spaced apart from each other, and a plurality of second touch sub-electrodes and a plurality of connection electrodes which are sequentially arranged along a second direction, the first direction intersects with the second direction and the plurality of first touch sub-electrodes and the plurality of second touch sub-electrodes are spaced apart from each other; the second metal layer comprises a plurality of bridge electrodes spaced apart from each other, and each of the plurality of bridge electrodes is electrically connected with two adjacent first touch sub-electrodes through a plurality of via structures in the insulating layer, so as to electrically connect any adjacent first touch sub-electrodes to form a first touch electrode extending in the first direction; the plurality of second touch sub-electrodes and the plurality of connection electrodes are alternately arranged one by one and electrically connected in sequence to form a second touch electrode extending along the second direction; an orthographic projection of each of the plurality of bridge electrodes on the base substrate is overlapped with an orthographic projection of a corresponding connection electrode on the base substrate; on a plane parallel to the main surface of the base substrate, the touch control structure is divided into a middle area and a peripheral area surrounding the middle area, at least in the middle area, the plurality of bridge electrodes comprise a first bridge electrode and a second bridge electrode which are adjacent to each other, and the two adjacent first touch sub-electrodes connected with the first bridge electrode are a first group of touch sub-electrodes, the two adjacent first touch sub-electrodes connected with the second bridge electrode are a second group of touch sub-electrodes, the first group of touch sub-electrodes and the second group of touch sub-electrodes are different touch sub-electrodes, a same side of the peripheral area comprises one bridge electrode, the bridge electrode is a third bridge electrode, and extension directions of the first bridge electrode and the second bridge electrode which are adjacent to each other are different, and an extension direction of the third bridge electrode is the same as an extension direction of a bridge electrode which is closest to the third bridge electrode in the middle area.

At least one embodiment of the present disclosure further provides a touch display panel, and the touch display panel includes a display structure and the touch control structure according to any one of the embodiments mentioned above, which are stacked on the base substrate.

At least one embodiment of the present disclosure further provides an electronic device, and the electronic device includes any one of the touch control structures mentioned above or the touch display panel mentioned above.

BRIEF DESCRIPTION OF DRAWINGS

In order to illustrate the technical solutions of the embodiments of the present disclosure clearer, the drawings of the embodiments will be briefly described. Obviously, the drawings in the following only relate to some embodiments of the present disclosure, and are not intended to limit the present disclosure.

DETAILED DESCRIPTION

Figure 1:
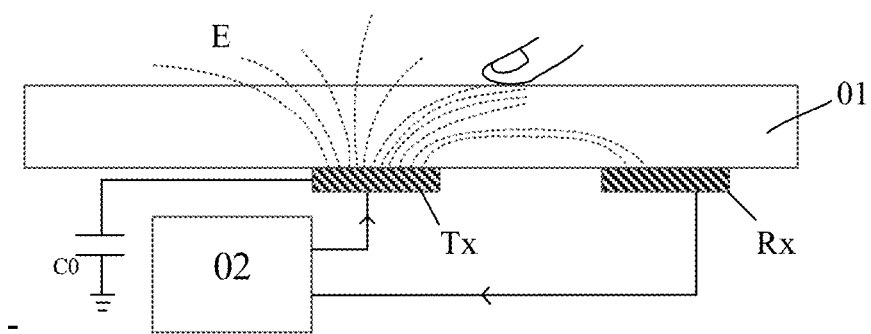
FIG. 1 is a schematic diagram of a capacitive touch control structure.

In order to make the purpose, technical scheme and advantages of the embodiment of the disclosure clearer, the technical scheme of the embodiment of the disclosure will be described clearly and completely with the attached drawings. Obviously, the described embodiment is a part of the embodiment of the present disclosure, not the whole embodiment. Based on the described embodiments of the present disclosure, all other embodiments obtained by ordinary people in the field without creative labor belong to the scope of protection of the present disclosure.

Unless otherwise defined, technical terms or scientific terms used in the present disclosure shall have their ordinary meanings as understood by people with ordinary skills in the field to which the present disclosure belongs. The terms "first", "second" and the like used in the present disclosure do not indicate any order, quantity or importance, but are only used to distinguish different components. Similar words such as "including" or "containing" mean that the elements or objects appearing before the word cover the elements or objects listed after the word and their equivalents, without excluding other elements or objects. Similar words such as "connected" or "connected" are not limited to physical or mechanical connection, but can include electrical connection, whether direct or indirect. "Up", "Down", "Left" and "Right" are only used to indicate the relative positional relationship. When the absolute position of the described object changes, the relative positional relationship may also change accordingly.

The drawings in the embodiment of the present disclosure are not drawn strictly according to the actual scale, and the number of the first touch electrodes, the second touch electrodes, the first touch sub-electrodes, the second touch sub-electrodes, the first metal layer and the second metal layer in the touch control structure is not limited to the number, size and structure shown in the drawings, and the specific size and number of each structure can be determined and adjusted according to actual needs. The drawings described in the embodiments of the present disclosure are only structural schematic diagrams and do not show the complete product structure.

With the development of touch technology and display technology, display devices with various shapes have been developed. Researchers are developing flexible display devices that can be curved and deformed or folded in a curved shape.

Organic light emitting diode (OLED) display panel has the characteristics of self-luminescence, high contrast, low energy consumption, wide viewing angle, fast response, can be used for flexible panels, wide temperature range and simple manufacture, and has broad development prospects. In order to meet the diverse needs of users, it is of great significance to integrate various functions in the display panel, such as touch control function and fingerprint identification function. For example, an on-cell touch control structure is formed in an OLED display panel, which realizes the touch function of the display panel by forming the touch control structure on the packaging film of the OLED display panel.

For example, the capacitive touch control structure includes a plurality of touch electrodes, which include a touch driving electrode and a touch sensing electrode extending in different directions, and the touch driving electrode Tx and the touch sensing electrode Rx form mutual capacitance for touch sensing at their intersection. The touch driving electrode Tx is used to input an excitation signal (touch driving signal), and the touch sensing electrode Rx is used to output a touch sensing signal. By inputting an excitation signal to, for example, a longitudinally extending touch driving electrode and receiving a touch sensing signal from, for example, a transversely extending touch sensing electrode, a detection signal reflecting the capacitance value of a coupling point (for example, an intersection point) between the transversely extending electrode and longitudinally extending electrode can be obtained. Upon a finger touching a touch screen (such as cover glass), the touch affects the coupling between the touch driving electrode and the touch sensing electrode which are close to the touch point, thus changing the capacitance of the mutual capacitance between the two electrodes at the intersection, and further leading to the change of the touch sensing signal. According to the data of two-dimensional capacitance variation of the touch screen based on the touch sensing signal, the coordinates of the touch point can be calculated.

For example, FIG. 1 is a schematic diagram of a capacitive touch control structure. As illustrated by FIG. 1, driven by a touch driving circuit 02, a touch driving signal is applied to a touch driving electrode Tx, thereby generating an electric field line E, which is received by a touch sensing electrode Rx to form a reference capacitance. Upon a finger touching the touch screen 01, because human body is a conductor, a part of the electric field lines E generated by the touch driving electrode Tx is guided to the finger to form a finger capacitance, which reduces the electric field lines E received by the touch sensing electrode Rx, so the capacitance value between the touch driving electrode Tx and the touch sensing electrode Rx is reduced. The touch driving circuit 02 obtains the capacitance value through the touch sensing electrode Rx, and compares it with the reference capacitance to obtain the variation of the capacitance value. According to the data of the variation of the capacitance value and the position coordinates of each touch capacitor, the coordinates of the touch point can be calculated.

For example, in some touch control structures, the touch driving electrode Tx includes a plurality of sub-electrodes connected by a bridge electrode, and there is an insulating layer between the bridge electrode and the touch sensing electrode Rx, and the bridge electrode and the touch sensing electrode Rx have an overlapping part in the direction perpendicular to the base substrate. The larger the area of the overlapping part, the greater the probability of short circuit between the bridge electrode and the touch sensing electrode Rx, and the touch effect of the touch control structure will be poor. For example, the poor touch effect includes increasing the probability of false alarm points and false touch, and at the same time, the power consumption of the touch circuit will be increased.

However, the inventor(s) of the present disclosure noticed that the overlapping area of the touch driving electrode Tx and the touch sensing electrode Rx can be reduced by reducing the length of the bridge electrode and making the touch driving electrode Tx and the touch sensing electrode Rx cross through a straight line, so that the capacitance value can be reduced. At present, in the structure of touch electrodes used, the overlapping area between the touch driving electrode Tx and the touch sensing electrode Rx is large, the capacitance Cm between the touch driving electrode Tx and the touch sensing electrode Rx is large, and the mutual capacitance value ΔCm changes slightly before and after finger touch, which is not conducive to the increase of ΔCm. The long bridge electrode is not conducive to improving the ratio of A Cm/Cm and the signal noise ratio (SNR). Moreover, the extension directions of two adjacent bridge electrodes cross each other and are symmetrical, which can also prevent the phenomenon of vanishing to some extent.

In addition, in the usual structural design, at the corner, that is, at the edge position where the signal line is connected, the jumper connection mode is adopted instead of the bridge electrode connection mode. However, the inventor(s) of the present disclosure noticed that it is also possible to adopt the connection mode of the bridge electrode at the corners, and then rotate the bridge electrode, that is, to keep the bridge electrode without moving the position of the bridge electrode, so as not to affect the electrode structure of the touch control structure as a whole, but also to avoid the design mode of the jumper design and the generation of additional noise. The inventor(s) of the present disclosure also noticed that, by expanding and contracting the metal layers stacked on both sides of the bridge electrode respectively, the path of short circuit between the touch driving electrode Tx and the touch sensing electrode Rx can be completely blocked, so that the probability of short circuit between the touch driving electrode Tx and the touch sensing electrode Rx at the position of the bridge electrode can be greatly reduced.

At least one embodiment of the present disclosure provides a touch control structure, which includes a base substrate, a first metal layer and a second metal layer stacked on the base substrate, and an insulating layer sandwiched between the first metal layer and the second metal layer, the first metal layer includes a plurality of first touch sub-electrodes arranged in sequence along a first direction and spaced apart from each other, and a plurality of second touch sub-electrodes and a plurality of connection electrodes which are arranged in sequence along a second direction, the first direction intersects with the second direction, and the plurality of first touch sub-electrodes and the plurality of second touch sub-electrodes are spaced apart from each other; the second metal layer includes a plurality of bridge electrodes spaced apart from each other, each of the plurality of bridge electrodes is electrically connected with two adjacent first touch sub-electrodes through a plurality of via structures in the insulating layer, so as to electrically connect any adjacent first touch sub-electrodes to form a first touch electrode extending in a first direction, and the plurality of second touch sub-electrodes and the plurality of connection electrodes are alternately arranged one by one and electrically connected in turn to form a second touch electrode extending in a second direction. An orthographic projection of each of the plurality of bridge electrodes on the base substrate is overlapped with an orthographic projection of a corresponding connection electrode on the base substrate. On a plane parallel to a main surface of the base substrate, the touch control structure is divided into a middle area and a peripheral area surrounding the middle area, at least in the middle area, the plurality of bridge electrodes include a first bridge electrode and a second bridge electrode which are adjacent to each other. The first bridge electrode and the second bridge electrode which are adjacent in the first direction are symmetrical about a straight line extending in the second direction, and the extension directions of the first bridge electrode and the second bridge electrode which are adjacent to each other intersect with each other, so that the ratio of the mutual capacitance change A Cm before and after finger touch to the capacitance Cm between the first touch electrode 105 (touch driving electrode Tx) and the second touch electrode 106 (touch sensing electrode Rx) can be improved, and the phenomenon of vanishing can be prevented.

Figure 2A:
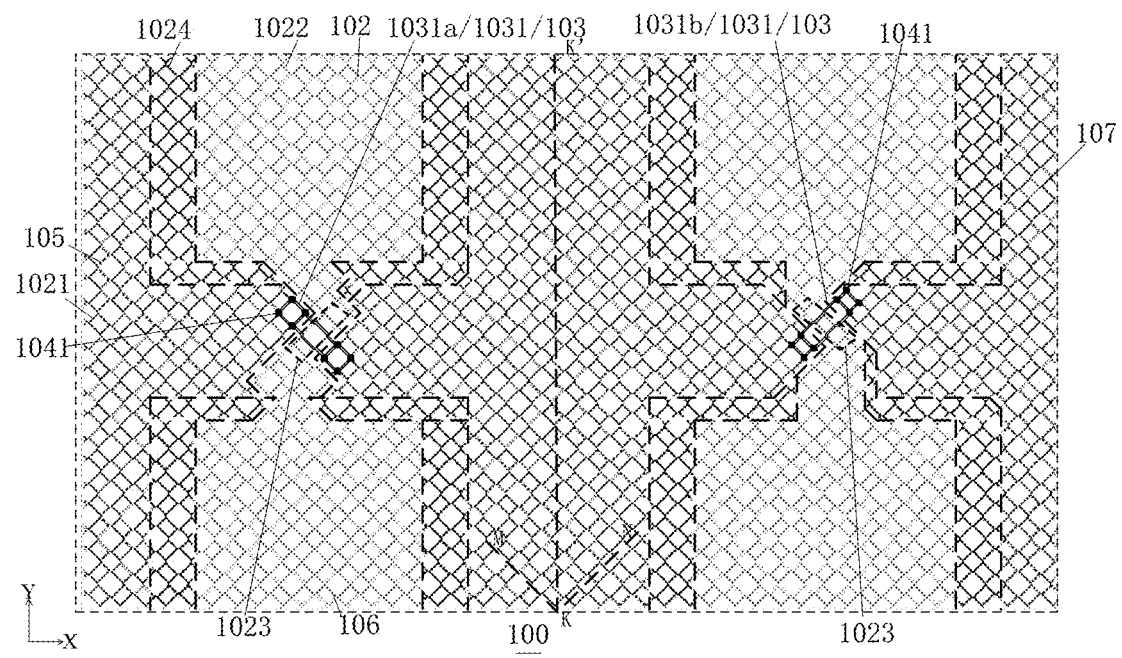
FIG. 2A is a schematic plan view of a touch control structure provided by at least one embodiment of the present disclosure.
Figure 3:
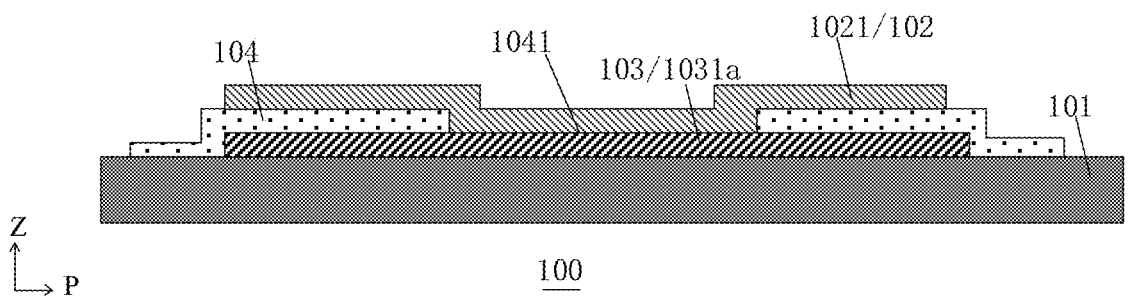
FIG. 3 is a schematic cross-sectional view of a touch control structure provided by at least one embodiment of the present disclosure.

For example, FIG. 2A is a schematic plan view of a touch control structure provided by at least one embodiment of the present disclosure, and FIG. 3 is a schematic cross-sectional view of a touch control structure provided by at least one embodiment of the present disclosure. With reference to FIG. 2A and FIG. 3, the touch electrode 100 includes: a base substrate 101, a first metal layer 102 and a second metal layer 103 stacked on the base substrate 101, and an insulating layer 104 sandwiched between the first metal layer 102 and the second metal layer 103, the first metal layer 102 includes a plurality of first touch sub-electrodes 1021 arranged in sequence along a first direction X and spaced apart from each other, and a plurality of second touch sub-electrodes 1022 and a plurality of connection electrodes 1023 which are arranged in sequence along a second direction Y, and the first direction X intersects with the second direction Y, and the plurality of first touch sub-electrodes 1021 and the plurality of second touch sub-electrodes 1022 are spaced apart from each other; the second metal layer 103 includes a plurality of bridge electrodes 1031 spaced apart from each other; each of the plurality of bridge electrodes 1031 is electrically connected with two adjacent first touch sub-electrodes 1021 through a plurality of via structures 1041 in the insulating layer 104, so as to electrically connect any adjacent first touch sub-electrodes 1021, that is, the first touch sub-electrodes 1021 are sequentially connected through the bridge electrodes 1031 to form a whole first touch electrode 105 extending along the first direction X. The plurality of second touch sub-electrodes 1022 and the plurality of connection electrodes 1023 are alternately arranged one by one and electrically connected in turn to form a whole second touch electrode 106 extending along the second direction Y. Because there is an insulating layer 104 between the bridge electrode 1031 and the connection electrode 1023, even if there is an overlapping part between the bridge electrode 1031 and the connection electrode 1023 in the plan view, the first touch electrode 105 and the second touch electrode 106 remain to be electrically insulated.

For example, as illustrated by FIG. 2A, an orthographic projection of each of the plurality of bridge electrodes 1031 on the base substrate 101 is overlapped with an orthographic projection of a corresponding connection electrode 1023 on the base substrate 101. With reference to FIG. 2A and FIG. 3, on a plane parallel to a main surface of the base substrate 101, the touch control structure 100 is divided into a middle area 107 and a peripheral area (not shown in FIG. 2A) surrounding the middle area 107, and at least in the middle area 107, the plurality of bridge electrodes 1031 include a first bridge electrode 1031*a* and a second bridge electrode 1031*b* which are adjacent to each other. The two adjacent first touch sub-electrodes 1021 connected with the first bridge electrode 1031*a* are a first group of touch sub-electrodes, and the two adjacent first touch sub-electrodes 1021 connected with the second bridge electrode 1031*b* are a second group of touch sub-electrodes, the first group of touch sub-electrodes and the second group of touch sub-electrodes are different sub-electrodes. The first bridge electrode 1031*a* and the second bridge electrode 1031*b* which are adjacent to each other in the first direction X are symmetrical about a straight line extending along the second direction Y. As illustrated by FIG. 2A, the first bridge electrode 1031*a* and the second bridge electrode 1031*b* which are adjacent to each other are symmetrical about a straight line K-K', and the straight line K-K' is parallel to the Y axis. The extension directions of the first bridge electrode 1031*a* and the second bridge electrode 1031*b* which are adjacent to each other intersect with each other, that is, as illustrated by FIG. 2A, the extension direction of the first bridge electrode 1031*a* and a straight line K-M are the same, the extension direction of the second bridge electrode 1031*b* and a straight line K-N are the same, and the straight line K-M and the straight line K-N intersect at K, the straight line K-M and the straight line K-N can be perpendicular to each other, or can also be non perpendicular to each other. In this way, on the basis of increasing the ratio of the change of mutual capacitance A Cm before and after finger touch to the capacitance Cm between the first touch electrode 105 (touch driving electrode Tx) and the second touch electrode 106 (touch sensing electrode Rx), the phenomenon of vanishing can be prevented.

It should be noted that in FIG. 2A, only the arrangement of the first touch electrode 105, the first bridge electrode 1031*a*, the second bridge electrode 1031*b*, the first touch sub-electrode 1021, the second touch sub-electrode 1022, the connection electrode 1023 and the second touch electrode 106 in the middle area 107 are shown, and the first touch electrode 105 and the second touch electrode 106 in the middle area 107 and their inclusion are described below, the arrangement of the first touch electrode 105 and the second touch electrode 106 in the surrounding area, as well as the structures included, will be explained separately in the following sections.

For example, an included angle between the first direction X and the second direction Y can be set to be between 70° and 90°, including 70° and 90°. For example, the included angle between the first direction X and the second direction Y can be 70°, 75°, 80°, 850 or 90°, etc., and the specific value of the included angle can be set according to the actual situation, which is not specified in the embodiment of the present disclosure.

For example, as illustrated by FIG. 2A, the first direction X may be set perpendicular to the second direction Y. In the case that the touch control structure provided by the embodiment of the present disclosure is applied to, for example, a touch display panel or a display device, the first direction X may be a column direction of sub-pixel array in the touch display panel or the display device, and the second direction Y may be a row direction of the sub-pixel array in the touch display panel or the display device; alternatively, the first direction X may be the row direction of the sub-pixel array in the touch display panel or the display device, and the second direction Y may be the column direction of the sub-pixel array in the touch display panel or display device, which is not limited by the embodiments of the present disclosure.

For example, as illustrated by FIG. 2A, the plurality of first touch sub-electrodes 1021 are arranged along the first direction X, and the bridge electrode 1031 is located between two adjacent first touch sub-electrodes 1021 in the first direction X, so that the adjacent two first touch sub-electrodes 1021 are electrically connected to each other through the bridge electrode 1031. The plurality of second touch sub-electrodes 1022 are arranged along the second direction Y, and the connection electrode 1023 is located between two adjacent second touch sub-electrodes 1022 in the second direction Y, so that the adjacent two second touch sub-electrodes 1022 are electrically connected with each other through the connection electrode 1023. For example, the connection electrode 1023 is also provided on the first metal layer 102. In one example, the connection electrode 1023, the first touch sub-electrode 1021 and the second touch sub-electrode 1022 are formed in the same process step, and the connection electrode 1023 and the second touch sub-electrode 1022 are formed into an integrated structure, but the connection electrode 1023 and the first touch sub-electrode 1021 are arranged at intervals.

It should be noted that, the number of the first touch sub-electrodes 1021 and the bridge electrodes 1031 included in the first touch electrode 105 shown in FIG. 2A and the number of the second touch sub-electrodes 1022 and the connection electrodes 1023 included in the second touch electrode 106 are only exemplary explanations, and the embodiment of the present disclosure does not specifically limit them.

It should be noted that the main body contour of the first touch sub-electrode 1021 in the first touch electrode 105 and the main body contour of the second touch sub-electrode 1022 in the second touch electrode 106 shown in FIG. 2A may both be generally rectangular, while in other embodiments of the present disclosure, the outer contour shapes of the first touch sub-electrodes 1021 and the second touch sub-electrodes 1022 may also adopt other regular shapes such as triangle, diamond, hexagon, octagon, elongated shape, etc, or irregular shapes, which is not limited in the embodiment of the present disclosure. For example, the main body contours of the first touch sub-electrode 1021 and the second touch sub-electrode 1022 may be the same or different from each other.

It should be noted that, in some other embodiments, two first touch sub-electrodes 1021 adjacent in the second direction Y may be connected by a bridge electrode, while two second touch sub-electrodes 1022 adjacent in the first direction X may be connected by, for example, a connection electrode which is located in the same layer as the second touch sub-electrodes 1022 and is integrally formed with the second touch sub-electrodes 1022, that is, the above-mentioned electrical connection method adopted by the two adjacent first touch sub-electrodes 1021 in the second direction and the above-mentioned electrical connection method adopted by the two adjacent second touch sub-electrodes 1022 in the first direction can be exchanged.

For example, in some embodiments of the present disclosure, the first touch electrode 105 and the second touch electrode 106 are insulated from each other, which may be that the first touch electrode 105 is a touch driving electrode and the second touch electrode 106 is a touch sensing electrode; alternatively, the first touch electrode 105 may be a touch sensing electrode and the second touch electrode 106 may be a touch driving electrode, which is not limited by the embodiment of the present disclosure.

For example, in the case that the above-mentioned touch control structure is applied to, for example, a touch display panel or a display device, each of the plurality of first touch electrodes 105 and each of the plurality of second touch electrodes 106 can be electrically connected to a signal line, and connected to a touch controller or a touch integrated circuit through the signal line. Taking the first touch electrode 105 as a touch sensing electrode and the second touch electrode 106 as a touch driving electrode as an example, the touch integrated circuit can be a touch chip, for example, for providing a touch driving signal to the second touch electrode 106, receiving the touch sensing signal from the first touch electrode 105 and processing the received touch sensing signal. For example, the processed data or signals are provided to the system controller to realize the touch sensing function. For example, one end of the signal line connected with the touch integrated circuit can be arranged on the same side of the touch area of the touch display panel to facilitate the connection with the touch integrated circuit, or one signal line can be respectively arranged at both ends of a second touch electrode 106, and the touch integrated circuit can simultaneously input a touch driving signal (bilateral driving) to a second touch electrode 106 through two signal lines during operation, so that the speed of signal loading on the second touch electrode 106 can be improved, thereby improving the detection speed.

For example, in one example, with reference to FIGS. 2A and 3, the base substrate 101 is a flexible base substrate, and the first metal layer 102 and the second metal layer 103 are disposed on the flexible base substrate. The first metal layer 102 includes a first touch electrode 105 (touch driving electrode Tx) and a second touch electrode 106 (touch sensing electrode Rx). Each first touch electrode 105 (touch driving electrode Tx) and each second touch electrode 106 (touch sensing electrode Rx) are respectively provided with a plurality of floating electrodes 1024, that is, the floating electrodes 1024 are arranged between the plurality of first touch sub-electrodes 1021 and the plurality of second touch sub-electrodes 1022. The floating electrode 1024 is insulated from the first touch electrode 105 (touch driving electrode Tx) and the second touch electrode 106 (touch sensing electrode Rx), that is, the floating electrode 1024 is electrically insulated from the plurality of first touch sub-electrodes 1021 and the plurality of second touch sub-electrodes 1022, and is also insulated from the connection electrode 1023, the first bridge electrode 1031a and the second bridge electrode 1031b. The floating electrode 1024 is arranged in the same layer as the first touch electrode 105 and the second touch electrode 106, so that the plurality of first touch sub-electrodes 1021, the plurality of second touch sub-electrodes 1022, the connection electrode 1023, the first bridge electrode 1031a, the second bridge electrode 1031b and the floating electrode 1024 are distributed in the entire middle area 107. Of course, the floating electrodes 1024 may not be provided between the plurality of first touch sub-electrodes 1021 and the plurality of second touch sub-electrodes 1022, so as to keep gaps between the plurality of first touch sub-electrodes 1021 and the plurality of second touch sub-electrodes 1022, as long as the plurality of first touch sub-electrodes 1021 and the plurality of second touch sub-electrodes 1022 are electrically insulated.

For example, as illustrated by FIG. 3, the direction perpendicular to the main surface of the base substrate 101 is the third direction Z, and the extension direction of the first bridge electrode 1031a on the plane parallel to the main surface of the base substrate 101 is the fourth direction P, a via structure 1041 is arranged in the insulating layer 104, the first metal layer 102 is electrically connected with the second metal layer 103 through the via structure 1041 in the insulating layer 104. That is, the first touch sub-electrode 1021 is electrically connected with the first bridge electrode 1031a located below the first touch sub-electrode 1021 through the via structure 1041 arranged in the insulating layer 104, and both ends of the first bridge electrode 1031a are respectively connected with one first touch sub-electrode 1021, so that two adjacent first touch sub-electrodes 1021 are electrically connected through the first bridge electrode 1031a.

Figure 4:
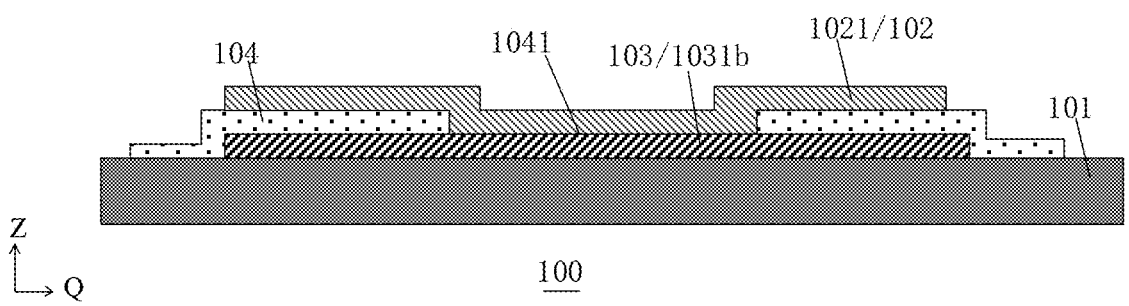
FIG. 4 is a schematic cross-sectional view of another touch control structure provided by at least one embodiment of the present disclosure.

For example, FIG. 4 is a schematic cross-sectional view of another touch control structure provided by at least one embodiment of the present disclosure. As illustrated by FIG. 4, the direction perpendicular to the main surface of the base substrate 101 is the third direction Z, and the extension direction of the second bridge electrode 1031b is the fifth direction Q on the plane parallel to the main surface of the base substrate 101. A via structure 1041 is provided in the insulating layer 104. The first metal layer 102 is electrically connected with the second metal layer 103 through the via structure 1041 arranged in the insulating layer 104, that is, the first touch sub-electrode 1021 is electrically connected with the second bridge electrode 1031b located in a lower layer of the first touch sub-electrode 1021 through the via structure 1041 arranged in the insulating layer 104, and both ends of the second bridge electrode 1031b are respectively connected with one first touch sub-electrode 1021, so that two adjacent first touch sub-electrodes 1021 are electrically connected through the second bridge electrode 1031b.

For example, in combination with FIGS. 2a to 4, the first bridge electrode 1031a and the second bridge electrode 1031b adjacent in the first direction X are symmetrical about a straight line extending in the second direction Y. For example, the extension direction of the first bridge electrode 1031a is the fourth direction P (the extension direction of the straight line KM), and the extension direction of the second bridge electrode 1031b is the fifth direction Q (the extension direction of the straight line KN). The fourth direction P and the fifth direction Q intersect and are symmetrical about the second direction Y, and an included angle between the fourth direction P and the fifth direction Q can be set at 50° to 90°, including 50° and 90°. The included angle between the fourth direction P and the fifth direction Q can be 50°, 55°, 60°, 65°, 70°, 75°, 80°, 85° or 90°, etc. The specific value of the included angle can be set according to the actual situation, and the embodiment of the present disclosure is not specifically limit thereto.

It should be noted that the axial symmetry of the first bridge electrode 1031a and the second bridge electrode 1031b in the first direction X with respect to the straight line extending in the second direction Y is not the true axial symmetry, but the overall external contours of the first bridge electrode 1031a and the second bridge electrode 1031b are approximately axial symmetry, so the difference of bending parts can be ignored, and the metal meshes contained in the bridge structures at different positions are not exactly the same.

For example, as illustrated by FIG. 4, the material of the insulating layer 104 can be an inorganic insulating material, for example, the inorganic insulating material is a transparent material. The inorganic insulating material is silicon oxide, silicon nitride, silicon oxynitride and other silicon oxides, silicon nitride or silicon oxynitride, or aluminum oxide, titanium nitride and other insulating materials including metal oxynitride.

For example, as illustrated by FIG. 4, the material of the insulating layer 104 can also be an organic insulating material to obtain good bending resistance. For example, the organic insulating material is a transparent material. For example, the organic insulating material is OCA optical glue. For example, the organic insulating material may include polyimide (PI), acrylate, epoxy resin, polymethylmethacrylate (PMMA) and the like.

For example, in combination with FIGS. 3 and 4, the first metal layer 102 is located at a side of the second metal layer 103 away from the base substrate 101. Alternatively, in other embodiments of the present disclosure, the second metal layer 103 may be located at a side of the first metal layer 102 away from the base substrate 101.

For example, in one example, the first metal layer 102 may be a conductive layer closer to the user side than the second metal layer 103, and further, in the case that the first touch sub-electrode 1021, the connection electrode 1023 and the second touch sub-electrode 1022 are all located in the first metal layer 102, the accuracy and sensitivity of signals received from the user side on the first touch electrode 105 and the second touch electrode 106 can be improved, thereby improving the touch of the touch substrate.

For example, in one example, as illustrated by FIG. 2A, each bridge electrode 1031 and each connection electrode 1023 extend substantially in a straight line, and the extension direction of each of the plurality of bridge electrodes 1031 is perpendicular to the extension direction of the corresponding connection electrode 1023. This arrangement can reduce the capacitance Cm between the first touch electrode 105 (touch driving electrode Tx) and the second touch electrode 106 (touch sensing electrode Rx).

It should be noted that the "extend substantially in a straight line" may refer to that the overall extension trend of each bridge electrode 1031 is a straight line and the overall extension trend of each connection electrode 1023 is a straight line, but there may be bent parts at some positions of the bridge electrode 1031 or the connection electrode 1023, or the entire bridge electrode 1031 and the entire connection electrode 1023 may extend along a straight line, which is not limited by the embodiment of the present disclosure.

Figure 2B:
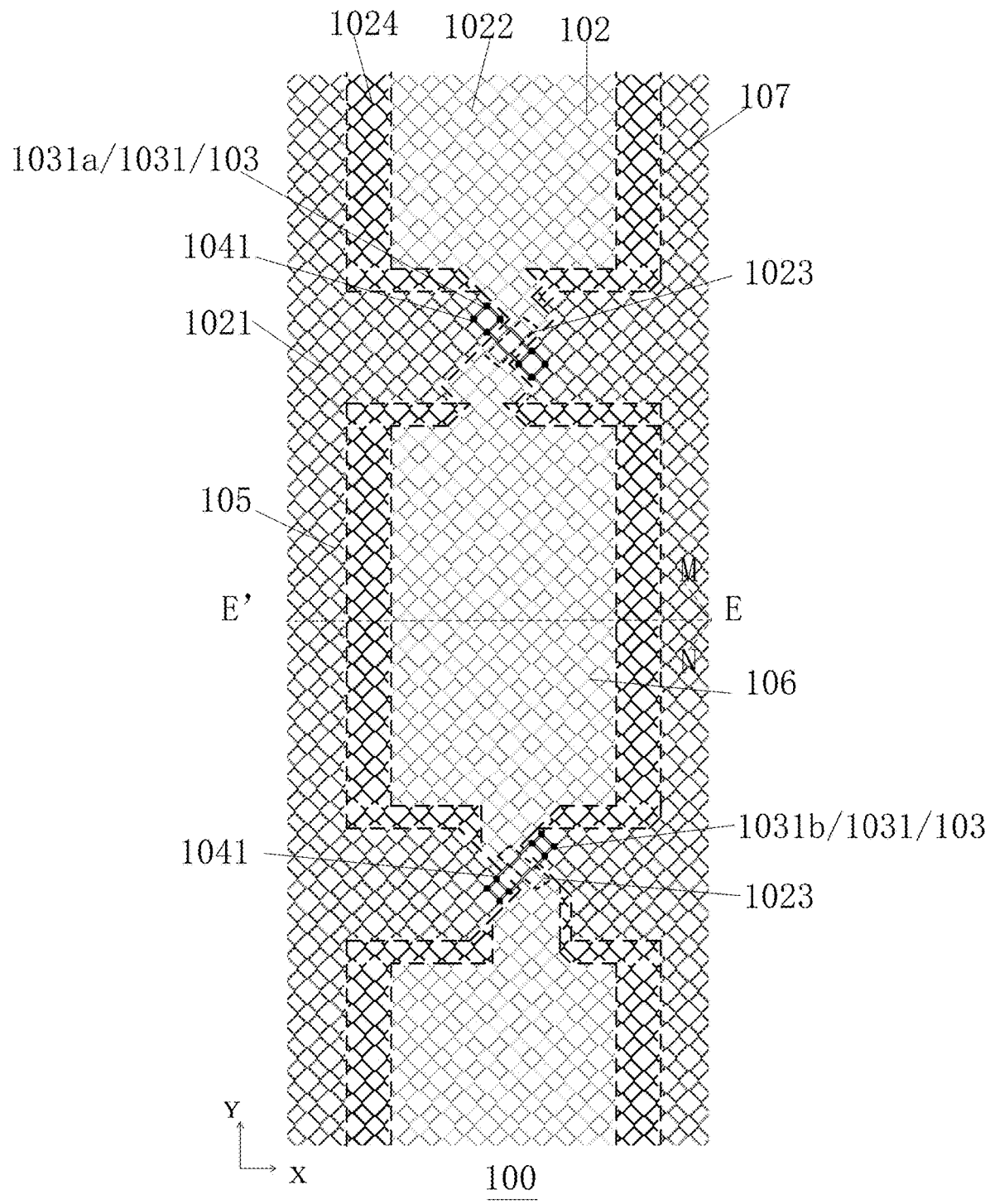
FIG. 2B is a schematic plan view of another touch control structure provided by at least one embodiment of the present disclosure.

For example, FIG. 2B is a schematic plan view of another touch control structure provided by at least one embodiment of the present disclosure. In FIG. 2B, the first bridge electrode 1031a and the second bridge electrode 1031b which are adjacent in the second direction Y are symmetrical about a straight line extending on the X axis in the first direction, and the first bridge electrode 1031a and the second bridge electrode 1031b which are adjacent to each other are symmetrical about a straight line E-E', which is parallel to X. The extension directions of the first bridge electrode 1031a and the second bridge electrode 1031b which are adjacent to each other intersect with each other, that is, as illustrated by FIG. 2B, the extension direction of the first bridge electrode 1031a and the extension direction of a straight line E-M are the same, the extension direction of the second bridge electrode 1031b and the extension direction of a straight line E-N are the same, and the straight line E-M and the straight line E-N intersect at E, the straight line E-M and the straight line E-N can be perpendicular to each other, or not perpendicular to each other. In this way, on the basis of increasing the ratio of the change of mutual capacitance $\Delta$Cm before and after finger touch to the capacitance Cm between the first touch electrode 105 (touch driving electrode Tx) and the second touch electrode 106 (touch sensing electrode Rx), the phenomenon of vanishing can be prevented.

For example, an included angle between the first direction X and the second direction Y can be set to be between 70° to 90°, including 70° and 90°. For example, the included angle between the first direction X and the second direction Y can be 70°, 75°, 80°, 85° or 90°, etc., and the specific value of the included angle can be set according to the actual situation, which is not specified in the embodiment of the present disclosure.

For example, as illustrated by FIG. 2B, the first direction X may be set perpendicular to the second direction Y. In the case that the touch control structure provided by the embodiment of the present disclosure is applied to, for example, a touch display panel or a display device, the first direction X may be a column direction of the sub-pixel array in the touch display panel or the display device, and the second direction Y may be a row direction of the sub-pixel array in the touch display panel or the display device. Alternatively, the first direction X may be the row direction of the sub-pixel array in the touch display panel or display device, and the second direction Y may be the column direction of the sub-pixel array in the touch display panel or display device, which is not limited by the embodiments of the present disclosure.

For example, as illustrated by FIG. 2B, a plurality of first touch sub-electrodes 1021 are arranged along the first direction X, and the bridge electrode 1031 is located between two adjacent first touch sub-electrodes 1021 in the first direction X, so that the adjacent two first touch sub-electrodes 1021 are electrically connected with each other through the bridge electrode 1031. A plurality of second touch sub-electrodes 1022 are arranged along the second direction Y, and the connection electrode 1023 is located between two adjacent second touch sub-electrodes 1022 in the second direction Y, so that the adjacent two second touch sub-electrodes 1022 are electrically connected with each other through the connection electrode 1023. For example, the connection electrode 1023 is also provided in the first metal layer 102. In one example, the connection electrode 1023, the first touch sub-electrode 1021 and the second touch sub-electrode 1022 are formed in the same process step, and the connection electrode 1023 and the second touch sub-electrode 1022 are formed into an integrated structure, but the connection electrode 1023 and the first touch sub-electrode 1021 are arranged at intervals.

It should be noted that the number of the first touch sub-electrodes 1021 and the bridge electrodes 1031 included in the first touch electrode 105 and the number of the second touch sub-electrodes 1022 and the connection electrodes 1023 included in the second touch electrode 106 shown in FIG. 2B are only exemplary descriptions, and the embodiment of the present disclosure does not specifically limit them.

It should be noted that the main body contours of the first touch sub-electrode 1021 in the first touch electrode 105 and the second touch sub-electrode 1022 in the second touch electrode 106 shown in FIG. 2B may both be generally rectangular, while in other embodiments of the present disclosure, the outer contour shapes of the first touch sub-electrode 1021 and the second touch sub-electrode 1022 may also adopt other regular shapes such as triangle, diamond, hexagon, octagon, bar, etc. For example, the main body contours of the first touch sub-electrode 1021 and the second touch sub-electrode 1022 may be the same or different from each other.

It should be noted that, in some other embodiments, two first touch sub-electrodes 1021 adjacent in the second direction Y may be connected by a bridge electrode, while two second touch sub-electrodes 1022 adjacent in the first direction X may be connected by, for example, a connection electrode which is located in the same layer as the second touch sub-electrodes 1022 and is integrally formed with the second touch sub-electrodes 1022, that is, the above-mentioned electrical connection method between two first touch sub-electrodes 1021 adjacent in the second direction Y is the same as that in the first direction X. That is, the above-mentioned electrical connection method adopted by the two adjacent first touch sub-electrodes 1021 in the second direction and the above-mentioned electrical connection method adopted by the two adjacent second touch sub-electrodes 1022 in the first direction can be exchanged.

For example, in some embodiments of the present disclosure, the first touch electrode 105 and the second touch electrode 106 are insulated from each other, which may be that the first touch electrode 105 is a touch driving electrode and the second touch electrode 106 is a touch sensing electrode; alternatively, the first touch electrode 105 may be a touch sensing electrode and the second touch electrode 106 may be a touch driving electrode, which is not limited by the embodiment of the present disclosure.

For example, in the case that the above-mentioned touch control structure is applied to, for example, a touch display panel or a display device, each first touch electrode 105 and each second touch electrode 106 can be electrically connected to a signal line, and connected to a touch controller or a touch integrated circuit through the signal line. Taking the first touch electrode 105 as a touch sensing electrode and the second touch electrode 106 as a touch driving electrode as an example, the touch integrated circuit can be a touch chip, for example, for providing a touch driving signal to the second touch electrode 106, receiving the touch sensing signal from the first touch electrode 105 and processing the received touch sensing signal. For example, the processed data or signals are provided to the system controller to realize the touch sensing function. For example, one end of the signal line connected with the touch integrated circuit can be arranged on the same side of the touch area of the touch display panel to facilitate the connection with the touch integrated circuit, or one signal line can be respectively arranged at both ends of a second touch electrode 106, and the touch integrated circuit can simultaneously input a touch driving signal (bilateral driving) to a second touch electrode 106 through two signal lines during operation, so that the speed of signal loading on the second touch electrode 106 can be improved, thereby improving the detection speed.

Figure 5:
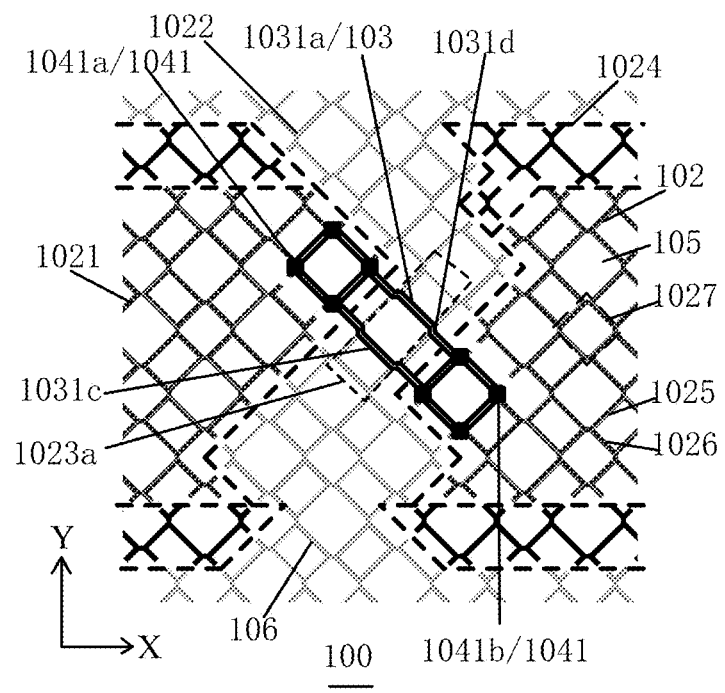
FIG. 5 is an enlarged structural diagram of a first bridge electrode connected to adjacent first touch sub-electrodes according to at least one embodiment of the present disclosure.

For example, FIG. 5 is an enlarged structural diagram of a first bridge electrode connected to adjacent first touch sub-electrodes according to at least one embodiment of the present disclosure. As illustrated by FIG. 5, the connection electrode 1023 includes a first connection electrode 1023a. The first bridge electrode 1031a corresponds to and intersects with the first connection electrode 1023a, both the first bridge electrode 1031a and the first connection electrode 1023a extend along a straight line, and both ends of the first bridge electrode 1031a are electrically connected with the corresponding first touch sub-electrode 1021 through a plurality of via structures 1041. For example, as illustrated by FIG. 5, the plurality of via structures 1041 include a first via structure 1041a and a second via structure 1041b which are oppositely arranged in the extension direction of each of the first bridge electrodes 1031a, and the first touch sub-electrode 1021 located at the first end of each of the first bridge electrodes 1031a is electrically connected with the corresponding first bridge electrode 1031a through the first via structure 1041a. The first touch sub-electrode 1021 located at the second end of each of the first bridge electrodes 1031a is electrically connected with the corresponding first bridge electrode 1031a through the second via structure 1041b, and the first end and the second end of each of the first bridge electrodes 1031a are opposite ends along the extension direction of the corresponding first bridge electrode 1031a, so that the first touch sub-electrode 1021 located at the first end of each of the first bridge electrodes 1031a and the first touch sub-electrode 1021 located at the second end of the corresponding first touch sub-electrode 1031a are electrically connected.

For example, as illustrated by FIG. 5, the first end of the first bridge electrode 1031a is electrically connected with the corresponding first touch sub-electrode 1021 through four first via structures 1041a, and the second end of the first bridge electrode 1031a is electrically connected with the corresponding first touch sub-electrode 1021 through four second via structures 1041b, thereby electrically connecting the first touch sub-electrodes 1021 at both ends of the first bridge electrode 1031a. Both the first end and the second end of the first bridge electrode 1031a are electrically connected with the corresponding first touch sub-electrodes 1021 through four via structures 1041, which can increase the stability of the connection and reduce the risk of disconnection.

For example, in one example, the plurality of via structures 1041 include at least two groups of first via structures 1041a and second via structures 1041b which are oppositely arranged in the extension direction of each of the bridge electrodes 1031, the bridge electrode 1031 may be the first bridge electrode 1031a or the second bridge electrode 1031b.

For example, as illustrated by FIG. 5, the plurality of via structures 1041 include four groups of first via structures 1041a and second via structures 1041b which are oppositely arranged in the extension direction of each of the first bridge electrodes 1031a, and four first via structures 1041a at the first end and four second via structures 1041b at the second end of the first bridge electrode 1031a constitute the four groups of via structures. Each first bridge electrode 1031a includes a first part 1031c and a second part 1031d which extend in parallel and are spaced apart from each other, and both the first part 1031c and the second part 1031d are electrically connected with two corresponding first via structures 1041a and the first touch sub-electrode 1021 at the first end of the corresponding first bridge electrode 1031a. Both the first part 1031c and the second part 1031d are electrically connected with the two corresponding second via structures 1041b and the first touch sub-electrode 1021 at the second end of the corresponding first bridge electrode 1031a. That is, the first part 1031c electrically connects the adjacent first touch sub-electrodes 1021 through two groups of first via structures 1041a and second via structures 1041b. The second part 1031d electrically connects the adjacent first touch sub-electrodes 1021 through two groups of first via structures 1041a and second via structures 1041b.

It should be noted that the embodiment of the present disclosure does not limit the specific numbers of the first via structures 1041a and the second via structures 1041b. For example, the number of the first via structures 1041a and the second via structures 1041b may both be five; alternatively, in other embodiments of the present disclosure, the number of the first via structures 1041a may also be 1, 2, 3, 6 or more, and the number of the second via structures 1041b may also be 1, 2, 3, 6 or more, and the embodiments of the present disclosure are not specifically limited thereto. It should be noted that, in the embodiment of the present disclosure, the number of the first via structures 1041a and the number of the second via structures 1041b may be the same as each other or different from each other.

For example, in one example, the first end of the first bridge electrode 1031*a* is electrically connected with the corresponding first touch sub-electrode 1021 through one first via structure 1041*a*, and the second end of the first bridge electrode 1031*a* is also electrically connected with the corresponding first touch sub-electrode 1021 through one second via structure 1041*b*. In another example, the first end of the first bridge electrode 1031*a* is electrically connected with the corresponding first touch sub-electrode 1021 through one first via structure 1041*a*, and the second end of the first bridge electrode 1031*a* is electrically connected with the corresponding first touch sub-electrode 1021 through a plurality of second via structures 1041*b*. In yet another example, the first end of the first bridge electrode 1031*a* is electrically connected with the corresponding first touch sub-electrodes 1021 through a plurality of first via structures 1041*a*, and the second end of the first bridge electrode 1031*a* is also electrically connected with the corresponding first touch sub-electrodes 1021 through a plurality of second via structures 1041*b*, as long as the adjacent first touch sub-electrodes 1021 can be electrically connected through the first bridge electrodes 1031*a*, which is not limited in the embodiment of the present disclosure.

For example, as illustrated by FIG. 5, each first bridge electrode 1031*a* and the corresponding first connection electrode 1023*a* both substantially extend along a straight line, and the extension direction of each of the plurality of first bridge electrodes 1031*a* is perpendicular to the extension direction of the corresponding first connection electrode 1023*a*. The above design can reduce the capacitance Cm between the first touch electrode 105 (touch driving electrode Tx) and the second touch electrode 106 (touch sensing electrode Rx), and can also reduce the problem of vanishing to a certain extent.

Figure 6:
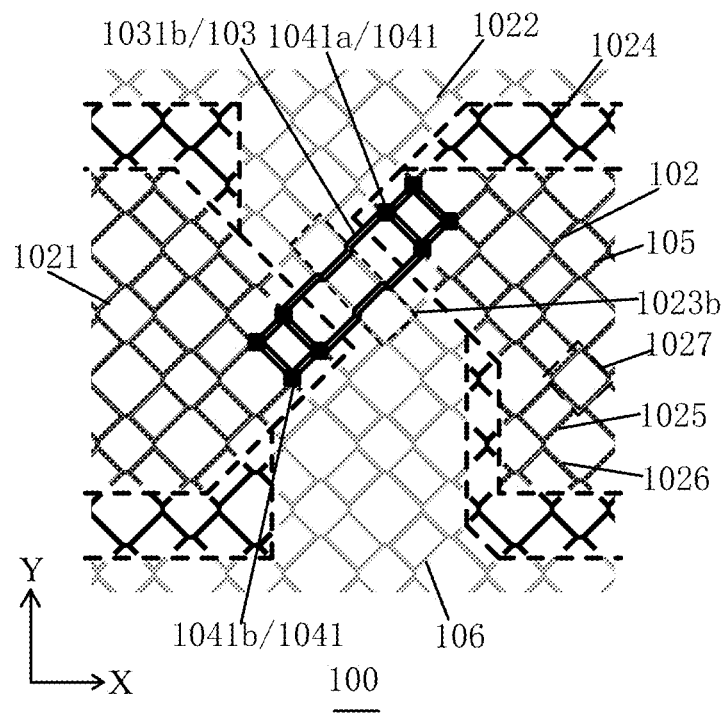
FIG. 6 is an enlarged structural diagram of a second bridge electrode connected to adjacent first touch sub-electrodes according to at least one embodiment of the present disclosure.

For example, FIG. 6 is an enlarged structural diagram of a second bridge electrode connected to adjacent first touch sub-electrodes according to at least one embodiment of the present disclosure. As illustrated by FIG. 6, the connection electrode 1023 further includes a second connection electrode 1023*b*, the second bridge electrode 1031 intersects with the second connection electrode 1023*b*, and both the second bridge electrode 1031*b* and the second connection electrode 1023*b* extend along a straight line, and both ends of the second bridge electrode 1031*b* are respectively electrically connected with the corresponding first touch sub-electrode 1021 through a plurality of via structures 1041. For example, as illustrated by FIG. 6, the plurality of via structures 1041 include a first via structure 1041*a* and a second via structure 1041*b* which are oppositely arranged in the extension direction of each of the second bridge electrodes 1031*b*, and the first touch sub-electrode 1021 located at the first end of each of the second bridge electrodes 1031*b* is electrically connected with the corresponding second bridge electrodes 1031*b* through the first via structure 1041*a*. The first touch sub-electrode 1021 located at the second end of each of the second bridge electrodes 1031*b* is electrically connected with the corresponding second bridge electrode 1031*b* through the second via structure 1041*b*, and the first end and the second end of each of the second bridge electrodes 1031*b* are opposite ends along the extension direction of the corresponding second bridge electrode 1031*b*, so that the first touch sub-electrode 1021 located at the first end of each of the second bridge electrodes 1031*b* and the first touch sub-electrode 1021 located at the second end of the corresponding second bridge electrode 1031*b* are electrically connected.

For example, as illustrated by FIG. 6, the first end of the second bridge electrode 1031*b* is electrically connected with the corresponding first touch sub-electrodes 1021 through four first via structures 1041*a*, and the second end of the second bridge electrode 1031*b* is electrically connected with the corresponding first touch sub-electrodes 1021 through four second via structures 1041*b*, thereby electrically connecting the first touch sub-electrodes 1021 at both ends of the second bridge electrode 1031*b*. Both the first end and the second end of the second bridge electrode 1031*b* are electrically connected with the corresponding first touch sub-electrode 1021 through four via structures 1041, which can increase the stability of the connection and reduce the risk of disconnection.

For example, the specific numbers of the first via structures 1041*a* and the second via structures 1041*b* are not limited. For example, the number of the first via structures 1041*a* and the second via structures 1041*b* can be referred to the above-mentioned related description with respect to FIG. 5.

For example, as illustrated by FIGS. 5 and 6, an orthographic projection of each bridge electrode 1031 (the first bridge electrode 1031*a* and the second bridge electrode 1031*b*) on the base substrate 101 and an orthographic projection of the first touch sub-electrodes 1021 connected to the first end and the second end of the bridge electrode 1031 are partially overlapped with each other, respectively. For example, a part of the first bridge electrode 1031*a* or the second bridge electrode 1031*b* corresponding to a quadrilateral shape formed by sequentially connecting the four first via structures 1041*a* at the first ends of the first bridge electrode 1031*a* or the second bridge electrode 1031*b* in a clockwise direction is overlapped with the first touch sub-electrode 1021.

For example, in some embodiments of the present disclosure, the first touch sub-electrode 1021, the second touch sub-electrode 1022 and the connection electrode 1023 respectively include a grid-like structure formed by a plurality of metal grids. The grid-like structure can be a closed metal grid or a non-closed metal grid.

It should be noted that the contour, the number of the included metal grids, the size and the shape of the grid-like structure shown in FIGS. 2A, 2B, 5 and 6 are only exemplary descriptions, that is, the number, shape and size of metal grids, closed metal grids and non-closed metal grids are only exemplary descriptions, and the embodiment of the present disclosure is not specifically limit thereto. The non-closed metal mesh is used as the edge of the first touch sub-electrode or the second touch sub-electrode, so that two adjacent first touch sub-electrodes, two adjacent second touch sub-electrodes, and adjacent first touch sub-electrodes and second touch sub-electrodes are disconnected to maintain insulation.

For example, the patterns of the grid-like structures shown in FIG. 2A, FIG. 2B, FIG. 5 and FIG. 6 are all polygons, such as quadrilateral shapes. In other embodiments of the present disclosure, the shapes of the metal grids can also be other polygons, such as triangles, pentagons, hexagons, etc., which can be designed according to actual needs. The specific shapes and sizes of the metal grids are not limited in the embodiments of the present disclosure. In the embodiments of the present disclosure, the case that the shapes of the metal grids are all quadrilateral shapes is described as an example.

For example, with reference to FIGS. 2A, 2B, 5 and 6, the first metal layer 102 includes a plurality of first metal grids 1027 defined by a plurality of first metal lines 1025 and a plurality of second metal lines 1026 which intersect with each other, and each of the plurality of first metal grids 1027 has a quadrilateral shape, and each of the plurality of first touch sub-electrodes 1021 and each of the second touch sub-electrodes 1022 respectively includes a plurality of first metal grids 1027. In the middle area 107, the extension directions of the first metal lines 1025 are all parallel to the extension direction of the second bridge electrode 1031*b*, and the extension directions of the second metal lines 1026 are all parallel to the extension direction of the first bridge electrode 1031*a*.

Of course, in other embodiments, the extension directions of the plurality of first metal lines 1025 may all be parallel to the extension direction of the first bridge electrode 1031*a*, and the extension directions of the plurality of second metal lines 1026 may all be parallel to the extension direction of the second bridge electrode 1031*b*, which is not limited by the embodiment of the present disclosure. However, in FIGS. 5 and 6, the case that the extension directions of the plurality of first metal lines 1025 are all parallel to the extension direction of the second bridge electrode 1031*b*, and the extension directions of the plurality of second metal lines 1026 are all parallel to the extension direction of the first bridge electrode 1031*a* are illustrated as an example.

For example, in FIGS. 5 and 6, the first touch sub-electrode 1021 includes a plurality of first metal grids 1027, at least some of the plurality of first metal grids 1027 have different areas, and the areas of the first metal grids 1027 are divided into three types, and the first metal grids 1027 with three different areas correspond to the first color sub-pixel, the second color sub-pixel and the third color sub-pixel mentioned later. Of course, one first metal grid 1027 may correspond to a plurality of sub-pixels, which is not limited by the embodiment of the present disclosure.

It should be noted that although the plurality of first metal lines 1025 and the plurality of second metal lines 1026 do not extend completely along a straight line, the corner portion existing at the junction of adjacent first metal grids 1027 can be ignored.

Figure 7:
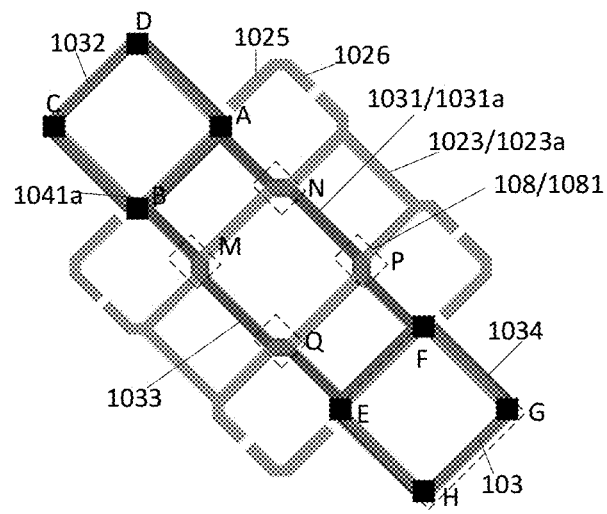
FIG. 7 is an enlarged structural diagram of a first bridge electrode provided by at least one embodiment of the present disclosure.

For example, FIG. 7 is an enlarged schematic diagram of the first bridge electrode provided by at least one embodiment of the present disclosure. As illustrated by FIG. 7, the connection electrode 1023 includes a first connection electrode 1023*a* corresponding to and intersecting with the first bridge electrode 1031*a*, and four first via structures 1041*a* at the first side of the first bridge electrode 1031*a* in the extension direction of the first bridge electrode 1031*a* are sequentially connected in a clockwise direction to form a first quadrilateral shape ABCD. The first quadrilateral shape ABCD is at an edge position of the corresponding first touch sub-electrode 1021, and the first quadrilateral shape ABCD includes a first edge AB and a second edge BC/AD which are connected with each other, that is, the first quadrilateral shape ABCD includes a first edge AB and two second edges BC, AD, and the first edge AB is formed by connecting two first via structures 1041*a* which are closest to the first connection electrode 1023*a* among the four first via structures 1041*a* at the first side, the first edge AB is parallel to the extension direction of the first metal line 1025, and the second edges BC/AD are two edges connected with the first edge AB, the second edge BC/AD is parallel to the extension direction of the second metal line 1026, and the first metal line 1025 corresponding to the first edge AB is disconnected at both ends. That is, at the positions of the dotted circle marked by labels A and B, the AB line has a gap between the side of A away from B and the first metal line 1025, and the AB line has a gap between the side of B away from A and the first metal line 1025.

For example, among the four first via structures 1041*a* at the first side, the first metal line 1025 corresponding to the first edge AB formed by connecting two first via structures 1041*a* which are closest to the first connection electrode 1023*a* at the first side is disconnected at both ends, which can prevent the short circuit between the first metal layer 102 and the second metal layer 103.

For example, as illustrated by FIG. 7, four second via structures 1041*b* at the second side of the first bridge electrode 1031*a* in the extension direction are sequentially connected in a clockwise direction to form a second quadrilateral shape EFGH, the first side and the second side are opposite sides in the extension direction of the first bridge electrode 1031*a*, and the second quadrilateral shape EFGH is at the edge position of the corresponding first touch sub-electrode 1021. The connection electrode 1023 includes a first connection electrode 1023*a* corresponding to and intersecting with the first bridge electrode 1031*a*, and the second quadrilateral shape EFGH includes a third edge EF and a fourth edge FG/EH which are connected with each other, that is, the second quadrilateral shape EFGH includes a third side EF and two fourth edges FG, EH, and the third edge EF is formed by connecting two second via structures 1041*b* which are closest to the first connection electrode 1023*a* among the four second via structures 1041*b* at the second side, the third edge EF is parallel to the extension direction of the first metal line 1025, the fourth edges FG and EH are two edges connected with the third edge EF, the fourth edges FG and EH are parallel to the extension direction of the second metal line 1026, and the first metal line 1025 corresponding to the third edge EF is disconnected at both ends. That is, at the positions of the dotted circle marked by labels E and F, the EF line has a gap between the side of E away from F and the first metal line 1025, and the EF line has a gap between the side of F away from E and the first metal line 1025.

For example, among the four second via structures 1041*b* at the second side, the first metal line 1025 corresponding to the third edge EF formed by connecting two second via structures 1041*b* which are closest to the first connection electrode 1023*a* is disconnected at both ends, which can prevent the short circuit between the first metal layer 102 and the second metal layer 103.

For example, as illustrated by FIG. 7, the second metal layer 103 includes a plurality of second metal grids 1034 defined by a plurality of third metal lines 1032 and a plurality of fourth metal lines 1033 intersecting with each other, the extension directions of the plurality of third metal lines 1032 are parallel to the extension directions of the first metal lines 1025, and the extension directions of the plurality of fourth metal lines 1033 are parallel to the extension directions of the second metal lines 1026, and each of the plurality of second metal grids 1034 has a quadrilateral shape.

For example, as illustrated by FIG. 7, in a part of the first metal layer 102 corresponding to the first bridge electrode 1031*a*, a width of the first metal line 1025 corresponding to the first edge AB and the third edge EF in the extension direction of the first bridge electrode 1031*a* is equal to a width of the other positions of the first metal line 1025 in the extension direction of the first bridge electrode 1031*a*. A width of the third metal line 1032 corresponding to the first edge AB and the third edge EF in the extension direction of the first bridge electrode 1031*a* is equal to a width of other positions of the third metal line 1032 in the extension direction of the first bridge electrode 1031*a*, and an edge of the first metal line 1025 corresponding to the first edge AB at a side close to a center of the first quadrilateral shape ABCD is closer to the center of the first quadrilateral shape ABCD than an edge of the third metal line 1032 corresponding to the first edge AB at a side close to the center of the first quadrilateral shape ABCD. Moreover, an orthographic projection of the first metal line 1025 corresponding to the first edge AB on the base substrate 101 and an orthographic projection of the third metal line 1032 corresponding to the first edge AB on the base substrate 101 are at least partially not overlapped with each other, that is, the first metal line 1025 corresponding to the first edge AB shrinks inward to a position close to the center of the first quadrilateral shape ABCD, and the third metal line 1032 corresponding to the first edge AB expands outward to a position away from the center of the first quadrilateral shape ABCD.

For example, as illustrated by FIG. 7, an edge of the first metal line 1025 at a side close to a center of the second quadrilateral shape EFGH corresponding to the third edge EF is closer to the center of the second quadrilateral shape EFGH than an edge of the third metal line 1032 at a side close to the center of the second quadrilateral shape EFGH corresponding to the third edge EF. Moreover, an orthographic projection of the first metal line 1025 corresponding to the third edge EF on the base substrate 101 and an orthographic projection of the third metal line 1032 corresponding to the third edge EF on the base substrate 101 are at least partially not overlapped with each other, that is, the first metal line 1025 corresponding to the third edge EF shrinks inward to a position close to the center of the second quadrilateral shape EFGH, and the third metal line 1032 corresponding to the third edge EF expands outward to a position away from the center of the second quadrilateral shape EFGH.

For example, as illustrated by FIG. 7, a width of the second metal line 1026 corresponding to the second edge BC/AD and the fourth edge FG/EH in the extension direction of the first connection electrode 1023*a* intersecting with the first bridge electrode 1031*a* is equal to a width of the other positions of the second metal line 1026 in the extension direction of the first connection electrode 1023*a*. A width of the fourth metal line 1033 corresponding to the second edge BC/AD and the fourth edge FG/EH in the extension direction of the first connection electrode 1023*a* intersecting with the first bridge electrode 1031*a* is equal to a width of the other positions of the fourth metal line 1033 in the extension direction of the first connection electrode 1023*a*.

For example, as illustrated by FIG. 7, an edge of the second metal line 1026 corresponding to the second edge BC/AD at a side close to a center of the first quadrilateral shape ABCD is closer to the center of the first quadrilateral shape ABCD than an edge of the fourth metal line 1033 corresponding to the second edge BC/AD at a side close to the center of the first quadrilateral shape ABCD. Moreover, an orthographic projection of the second metal line 1026 corresponding to the second edge BC/AD on the base substrate 101 and an orthographic projection of the fourth metal line 1033 corresponding to the second edge BC/AD on the base substrate 101 are at least partially not overlapped with each other, that is, the second metal line 1026 corresponding to the second edge BC/AD shrinks inward to a position close to the center of the first quadrilateral shape ABCD, and the fourth metal line 1033 corresponding to the second edge BC/AD expands outward a position away from the center of first quadrilateral shape ABCD.

For example, as illustrated by FIG. 7, an edge of the second metal line 1026 corresponding to the fourth edge FG/EH at a side close to a center of the second quadrilateral shape EFGH is closer to the center of the second quadrilateral shape EFGH than an edge of the fourth metal line 1033 corresponding to the fourth edge FG/EH at a side close to the center of the second quadrilateral shape EFGH. Moreover, an orthographic projection of the second metal line 1026 corresponding to the fourth edge FG/EH on the base substrate 101 and an orthographic projection of the fourth metal line 1033 corresponding to the fourth edge FG/EH on the base substrate 101 are at least partially not overlapped with each other, that is, the second metal line 1026 corresponding to the fourth edge FG/EH shrinks inward to a position close to the center of the second quadrilateral shape EFGH, and the fourth metal line 1033 corresponding to the fourth edge FG/EH expands outward to a position away from the center of the second quadrilateral shape EFGH.

For example, as illustrated by FIG. 7, on the plane parallel to the main surface of the base substrate 101 and in the extension direction of the first bridge electrode 1031*a*, a distance between the edge of the first metal line 1025 corresponding to the first edge AB at a side close to the center of the first quadrilateral shape ABCD and the edge of the third metal line 1032 corresponding to the first edge AB at a side close to the center of the first quadrilateral shape ABCD ranges from 1 μm to 1.4 μm. For example, the distance is 1 μm, 1.1 μm, 1.2 μm, 1.3 μm or 1.4 μm.

For example, as illustrated by FIG. 7, in the extension direction of the first bridge electrode 1031*a*, a distance between the edge of the first metal line 1025 corresponding to the third edge EF at a side close to the center of the second quadrilateral shape EFGH and the edge of the third metal line 1032 corresponding to the third edge EF at a side close to the center of the second quadrilateral shape EFGH ranges from 1 μm to 1.4 μm. For example, the distance is 1 μm, 1.1 μm, 1.2 μm, 1.3 μm or 1.4 μm.

For example, as illustrated by FIG. 7, on the plane parallel to the main surface of the base substrate 101, a distance between the edge of the second metal line 1026 corresponding to the second edge BC at a side close to the center of the first quadrilateral shape ABCD and the edge of the fourth metal line 1033 corresponding to the second edge BC at a side close to the center of the first quadrilateral shape ABCD in the extension direction of the first connection electrode 1023*a* ranges from 1 μm to 1.4 μm. That is, the second metal line 1026 corresponding to the second edge BC shrinks inward to the center position of the first quadrilateral shape ABCD, and the fourth metal line 1033 corresponding to the second edge BC expands outwards to an edge at a side away from the center of the first quadrilateral shape ABCD. Therefore, the edge of the second metal line 1026 corresponding to the second edge BC at a side close to the center of the first quadrilateral shape ABCD and the edge of the fourth metal line 1033 corresponding to the second edge BC at a side close to the center of the first quadrilateral shape ABCD have a certain distance in the extension direction of the first connection electrode 1023*a*, for example, the distance is 1 μm, 1.1 μm, 1.2 μm, 1.3 μm or 1.4 μm.

For example, as illustrated by FIG. 7, a distance between the edge of the second metal line 1026 corresponding to the second edge AD at a side close to the center of the first quadrilateral shape ABCD and the edge of the fourth metal line 1033 corresponding to the second edge AD at a side close to the center of the first quadrilateral shape ABCD in the extension direction of the first connection electrode 1023*a* ranges from 1 µm to 1.4 µm. That is, the second metal line 1026 corresponding to the second edge AD shrinks inward to the central position of the first quadrilateral shape ABCD, and the fourth metal line 1033 corresponding to the second edge AD expands outwards to a position away from the center of the first quadrilateral shape ABCD. Therefore, the edge of the second metal line 1026 corresponding to the second edge AD at a side close to the center of the first quadrilateral shape ABCD and the edge of the fourth metal line 1033 corresponding to the second edge AD at a side close to the center of the first quadrilateral shape ABCD have a certain distance in the extension direction of the first connection electrode 1023*a*. For example, the distance is 1 µm, 1.1 µm, 1.2 µm, 1.3 µm or 1.4 µm.

For example, as illustrated by FIG. 7, the distance between the edge of the second metal line 1026 corresponding to the fourth edge FG at a side close to the center of the second quadrilateral shape EFGH and the edge of the fourth metal line 1033 corresponding to the fourth edge FG at a side close to the center of the second quadrilateral shape EFGH in the extension direction of the first connection electrode 1023*a* ranges from 1 µm to 1.4 µm. That is, the second metal line 1026 corresponding to the fourth edge FG is shrinks inward to the central position of the first quadrilateral shape ABCD, and the fourth metal line 1033 corresponding to the fourth edge FG expands outwards to a position away from the center of the first quadrilateral shape ABCD. Therefore, the edge of the second metal line 1026 corresponding to the fourth edge FG at a side close to the center of the first quadrilateral shape ABCD and the edge of the fourth metal line 1033 corresponding to the fourth edge FG at a side close to the center of the first quadrilateral shape ABCD have a certain distance in the extension direction of the first connection electrode 1023*a*. For example, the distance is 1 µm, 1.1 µm, 1.2 µm, 1.3 µm or 1.4 µm.

For example, as illustrated by FIG. 7, the distance between the edge of the second metal line 1026 corresponding to the fourth edge EH at a side close to the center of the second quadrilateral shape EFGH and the edge of the fourth metal line 1033 corresponding to the fourth edge EH at a side close to the center of the second quadrilateral shape EFGH in the extension direction of the first connection electrode 1023*a* ranges from 1 µm to 1.4 µm. That is, the second metal line 1026 corresponding to the fourth edge EH is shrinks inward to the central position of the first quadrilateral shape ABCD, and the fourth metal line 1033 corresponding to the fourth edge EH expands outwards to a position away from the center of the first quadrilateral shape ABCD. Therefore, the edge of the second metal line 1026 corresponding to the fourth side EH at a side close to the center of the first quadrilateral shape ABCD and the edge of the fourth metal line 1033 corresponding to the fourth edge EH at a side close to the center of the first quadrilateral shape ABCD have a certain distance in the extension direction of the first connection electrode 1023*a*. For example, the distance is 1 µm, 1.1 µM, 1.2 µm, 1.3 µm or 1.4 µm.

For example, in some embodiments of the present disclosure, the materials of the first metal line 1025, the second metal line 1026, the third metal line 1032 and the fourth metal line 1033 may include metal materials such as aluminum, molybdenum, copper, silver or alloy materials of these metal materials, such as silver-palladium-copper alloy (APC) materials.

Figure 8:
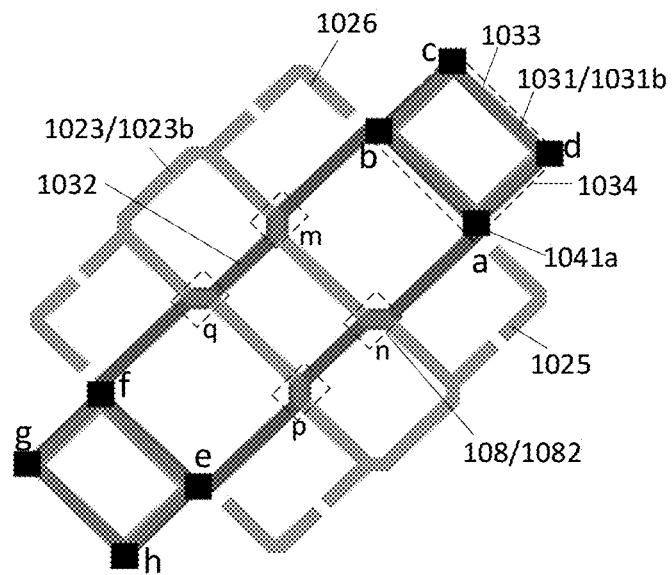
FIG. 8 is an enlarged structural diagram of a second bridge electrode provided by at least one embodiment of the present disclosure.

For example, FIG. 8 is an enlarged structural schematic diagram of the second bridge electrode provided by at least one embodiment of the present disclosure. As illustrated by FIG. 8, the connection electrode 1023 includes a second connection electrode 1023*b*, the second bridge electrode 1031*b* corresponds to and intersects with the second connection electrode 1023*b*, and four first via structures 1041*a* at the first side of the second bridge electrode 1031*b* in the extension direction of the second bridge electrode 1031*b* are connected in sequence to form a third quadrilateral shape abcd. The third quadrilateral shape abcd is at the edge position of the corresponding first touch sub-electrode 1021, and includes a fifth edge ab and a sixth edge bc/ad which are connected with each other, and the third quadrilateral shape abcd includes one fifth edge ab and two sixth edges bc/ad, and the fifth edge ab is formed by connecting two first via structures 1041*a* which are closest to the second connection electrode 1023*b* among the four first via structures 1041*a* at the first side, and the fifth edge ab is parallel to the extension direction of the second metal line 1026, and the sixth edges bc/ad are two edges connected with the fifth edge ab, the sixth edge bc/ad is parallel to the extension direction of the first metal line 1025 and corresponds to the second edge ab. That is, at the positions of the dotted circle marked by labels a and b, the ab line has a gap between the side of a away from b and the second metal line 1026, and the ab line has a gap between the side of b away from a and the second metal line 1026.

For example, among the four first via structures 1041*a* at the first side, the second metal line 1026 corresponding to the first edge ab formed by connecting two first via structures 1041*a* which are closest to the second connection electrode 1023*b* is disconnected at both ends to prevent the short circuit between the first metal layer 102 and the second metal layer 103.

For example, as illustrated by FIG. 8, four second via structures 1041*b* at the second side of the second bridge electrode 1031*b* in the extension direction of the second bridge electrode 1031*b* are sequentially connected in a clockwise direction to form a fourth quadrilateral shape efgh. The first side and the second side are two opposite sides in the extension direction of the second bridge electrode 1031*b*, and the fourth quadrilateral shape efgh is at the edge position of the corresponding first touch sub-electrode 1021. The connection electrode 1023 includes a second connection electrode 1023*b* corresponding to and intersecting with the second bridge electrode 1031*b*, the fourth quadrilateral shape efgh including a seventh edge ef and an eighth edge fg/eh which are connected with each other, and the fourth quadrilateral shape efgh including one seventh edge ef and two eighth edges fg/eh, and the seventh edge ef is formed by connecting two second via structures 1041*b* which are closest to the second connection electrode 1023*b* among the four second via structures 1041*b* at the second side, the seventh edge ef is parallel to the extension direction of the second metal line 1026, the eighth edge fg/eh is parallel to the extension direction of the first metal line 1025, and the second metal line 1026 corresponding to the seventh edge ef is disconnected at both ends. That is, at the position of the dotted circle marked by labels e and f, the ef line has a gap between the side of e away from f and the second metal line 1026, and the ef line has a gap between the side of f away from e and the second metal line 1026.

For example, among the four second via structures 1041*b* at the second side, the second metal line 1026 corresponding to the seventh edge ef formed by connecting two second via structures 1041*b* which are close to the second connection electrode 1023*b* which is closest to the four second via structures 1041*b* is disconnected at both ends to prevent the short circuit between the first metal layer 102 and the second metal layer 103.

For example, as illustrated by FIG. 8, the second metal layer 103 includes a plurality of second metal grids 1034 defined by a plurality of third metal lines 1032 and a plurality of fourth metal lines 1033 intersecting with each other, the extension directions of the plurality of third metal lines 1032 are parallel to the extension direction of the first metal lines 1025, and the extension directions of the plurality of fourth metal lines 1033 are parallel to the extension direction of the second metal lines 1026, and each of the plurality of second metal grids 1034 has a quadrilateral shape.

For example, as illustrated by FIG. 8, in a part of the first metal layer 102 corresponding to the second bridge electrode 1031*b*, a width of the second metal line 1026 corresponding to the fifth edge ab and the seventh edge ef in the extension direction of the second bridge electrode 1031*b* is equal to a width of the second metal line 1026 in the extension direction of other positions of the second bridge electrode 1031*b*. A width of the fourth metal line 1033 corresponding to the fifth edge ab and the seventh edge ef in the extension direction of the second bridge electrode 1031*b* is equal to a width of other positions of the fourth metal line 1033 in the extension direction of the second bridge electrode 1031*b*, and the edge of the second metal line 1026 corresponding to the fifth edge ab at a side close to a center of the third quadrilateral shape abcd is closer to the center of the third quadrilateral shape abcd than the edge of the fourth metal line 1033 corresponding to the fifth edge ab at a side close to the center of the third quadrilateral shape abcd. Moreover, an orthographic projection of the second metal line 1026 corresponding to the fifth edge ab on the base substrate 101 and an orthographic projection of the fourth metal line 1033 corresponding to the fifth edge ab on the base substrate 101 are at least partially not overlapped with each other, that is, the second metal line 1026 corresponding to the fifth edge ab shrinks inward to a position close to the center of the third quadrilateral shape abcd, and the fourth metal line 1033 corresponding to the fifth edge ab expands outward to a position away from the center of the third quadrilateral shape abcd.

For example, as illustrated by FIG. 8, an edge of the second metal line 1026 corresponding to the seventh edge ef at a side close to a center of the fourth quadrilateral shape efgh is closer to the center of the fourth quadrilateral shape efgh than an edge of the fourth metal line 1033 corresponding to the seventh edge ef at a side close to the center of the fourth quadrilateral shape efgh. Moreover, an orthographic projection of the second metal line 1026 corresponding to the seventh edge ef on the base substrate 101 and an orthographic projection of the fourth metal line 1033 corresponding to the seventh edge ef on the base substrate 101 are at least partially not overlapped with each other, that is, the second metal line 1026 corresponding to the seventh edge ef shrinks inward to a position close to the center of the fourth quadrilateral shape efgh, and the fourth metal line 1033 corresponding to the seventh edge ef expands outward to a position away from the center of the fourth quadrilateral shape efgh.

For example, as illustrated by FIG. 8, a width of the first metal line 1025 corresponding to the sixth edge bc/ad and the eighth edge fg/eh in the extension direction of the second connection electrode 1023*b* is equal to a width of other positions of the first metal line 1025 in the extension direction of the second connection electrode 1023*b*. A width of the third metal line 1032 corresponding to the sixth edge bc/ad and the eighth edge fg/eh in the extension direction of the second connection electrode 1023*b* is equal to a width of other positions of the third metal line 1032 in the extension direction of the second connection electrode 1023*b*.

For example, as illustrated by FIG. 8, the edge of the first metal line 1025 corresponding to the sixth edge bc/ad at a side close to the center of the third quadrilateral shape abcd is closer to the center of the third quadrilateral shape abcd than the edge of the third metal line 1032 corresponding to the sixth edge bc/ad. Moreover, an orthographic projection of the first metal line 1025 corresponding to the sixth edge bc/ad on the base substrate 101 and an orthographic projection of the third metal line 1032 corresponding to the sixth edge bc/ad on the base substrate 101 are at least partially not overlapped with each other, that is, the first metal line 1025 corresponding to the first metal line 1025 corresponding to the sixth edge bc/ad shrinks inward to a position close to the center of the third quadrilateral shape abcd, and the third metal line 1032 corresponding to the sixth edge bc/ad expands outwards to a position away from the center of the third quadrilateral shape abcd.

For example, as illustrated by FIG. 8, the edge of the first metal line 1025 corresponding to the eighth edge fg/eh at a side close to the center of the fourth quadrilateral shape efgh is closer to the center of the fourth quadrilateral shape efgh than the edge of the third metal line 1032 corresponding to the eighth edge fg/eh at a side close to the center of the fourth quadrilateral shape efgh. Moreover, an orthographic projection of the first metal line 1025 corresponding to the eighth edge fg/eh on the base substrate 101 and an orthographic projection of the third metal line 1032 corresponding to the eighth edge fg/eh on the base substrate 101 are at least partially not overlapped with each other, that is, the first metal line 1025 corresponding to the eighth edge fg/eh shrinks inward to a position close to the center of the fourth quadrilateral shape efgh, and the third metal line 1032 corresponding to the eighth edge fg/eh expands outwards to a position away from the center of the fourth quadrilateral shape efgh.

For example, as illustrated by FIG. 8, on the plane parallel to the main surface of the base substrate 101 and in the extension direction of the second bridge electrode 1031*b*, the distance between the edge of the second metal line 1026 corresponding to the fifth edge ab at a side close to the center of the third quadrilateral shape abcd and the edge of the fourth metal line 1033 corresponding to the fifth edge ab at a side close to the center of the third quadrilateral shape abcd is ranges from 1 μm to 1.4 μm. For example, the distance is 1 μm, 1.1 μm, 1.2 μm, 1.3 μm or 1.4 μm.

For example, as illustrated by FIG. 8, in the extension direction of the second bridge electrode 1031*b*, the distance between the edge of the second metal line 1026 close to the center of the fourth quadrilateral shape efgh corresponding to the seventh edge ef and the edge of the fourth metal line 1033 close to the center of the fourth quadrilateral shape efgh corresponding to the seventh edge EF ranges from 1 μm to 1.4 μm. For example, the distance is 1 μm, 1.1 μm, 1.2 μm, 1.3 μm or 1.4 μm.

For example, as illustrated by FIG. 8, on the plane parallel to the main surface of the base substrate 101, the distance between the edge of the first metal line 1025 corresponding to the sixth edge be at a side close to the center of the third quadrilateral shape abcd and the edge of the third metal line 1032 corresponding to the sixth edge be at a side close to the center of the third quadrilateral shape abcd in the extension direction of the second connection electrode 1023*b* ranges from 1 µm to 1.4 µm. That is, the first metal line 1025 corresponding to the sixth edge be shrinks inward to the central position of the third quadrilateral shape abcd, and the third metal line 1032 corresponding to the sixth edge be expands outwards to a position away from the center of the third quadrilateral shape abcd. Therefore, the edge of the first metal line 1025 corresponding to the sixth edge be at a side close to the center of the third quadrilateral shape abcd and the edge of the fourth metal line 1033 corresponding to the sixth edge be at a side close to the center of the third quadrilateral shape abcd have a certain distance in the extension direction of the second connection electrode 1023*b*. For example, the distance is 1 µm, 1.1 µm, 1.2 am, 1.3 µm or 1.4 µm.

For example, as illustrated by FIG. 8, the distance between the edge of the first metal line 1025 close to the center of the third quadrilateral shape abcd corresponding to the sixth edge ad and the edge of the third metal line 1032 close to the center of the third quadrilateral shape abcd corresponding to the sixth edge ad in the extension direction of the second connection electrode 1023*b* ranges from 1 µm to 1.4 µm. That is, the first metal line 1025 corresponding to the sixth edge ad shrinks inward to the central position of the third quadrilateral shape abcd, and the third metal line 1032 corresponding to the sixth edge ad expands outwards to a position away from the center of the third quadrilateral shape abcd. Therefore, the edge of the first metal line 1025 corresponding to the sixth edge ad at a side close to the center of the third quadrilateral shape abcd and the edge of the fourth metal line 1033 corresponding to the sixth edge ad at a side close to the center of the third quadrilateral shape abcd have a certain distance in the extension direction of the second connection electrode 1023*b*. For example, the distance is 1 µm, 1.1 µm, 1.2 µm, 1.3 µm or 1.4 µm.

For example, as illustrated by FIG. 8, the distance between the edge of the first metal line 1025 corresponding to the eighth edge fg at a side close to the center of the fourth quadrilateral shape efgh and the edge of the third metal line 1032 corresponding to the eighth edge fg at a side close to the center of the fourth quadrilateral shape efgh in the extension direction of the second connection electrode 1023*b* ranges from 1 µm to 1.4 µm. That is, the first metal line 1025 corresponding to the eighth edge fg shrinks inward to the center of the fourth quadrilateral shape efgh, and the third metal line 1032 corresponding to the eighth edge fg expands outwards to a position away from the center of the fourth quadrilateral shape efgh. Therefore, the edge of the first metal line 1025 corresponding to the eighth edge fg at a side close to the center of the fourth quadrilateral shape efgh and the edge of the third metal line 1032 corresponding to the eighth edge fg at a side close to the center of the fourth quadrilateral shape efgh have a certain distance in the extension direction of the second connection electrode 1023*b*. For example, the distance is 1 µm, 1.1 µm, 1.2 µm, 1.3 µm or 1.4 µm.

For example, as illustrated by FIG. 8, the distance between the edge of the first metal line 1025 corresponding to the eighth edge eh at a side close to the center of the fourth quadrilateral shape efgh and the edge of the third metal line 1032 corresponding to the eighth edge eh at a side close to the center of the fourth quadrilateral shape efgh in the extension direction of the second connection electrode 1023*b* ranges from 1 µm to 1.4 µm. That is, the first metal line 1025 corresponding to the eighth edge eh shrinks inward to the center position of the fourth quadrilateral shape efgh, and the third metal line 1032 corresponding to the eighth edge eh expands outward to a position away from the center of the fourth quadrilateral shape efgh. Therefore, the edge of the first metal line 1025 corresponding to the eighth edge eh at a side close to the center of the fourth quadrilateral shape efgh and the edge of the third metal line 1032 corresponding to the eighth edge eh at a side close to the center of the fourth quadrilateral shape efgh have a certain distance in the extension direction of the second connection electrode 1023*b*. For example, the distance is 1 µm, 1.1 µm, 1.2 µm, 1.3 µm or 1.4 µm.

For example, as illustrated by FIGS. 2A and 5-8, the bridge electrode 1031 and the connection electrode 1023 intersect to form a plurality of overlapping parts 108, and an orthographic projection of a part corresponding to the first metal layer 102 on the base substrate 101 is smaller than an orthographic projection of a part corresponding to the second metal layer 103 on the base substrate 101. And the orthographic projection of the part corresponding to the first metal layer 102 on the base substrate 101 is within the orthographic projection of the part corresponding to the second metal layer 103 on the base substrate 101, that is, the width of the part corresponding to of the second metal layer 103 in the first direction X or the second direction Y is increased at the corresponding position of the overlapping part 108.

For example, as illustrated by FIG. 2A and FIG. 5-8, in a direction perpendicular to a straight line formed by connecting adjacent overlapping parts 108, a width of the part corresponding to the bridge electrode 1031 between adjacent overlapping parts 108 is smaller than a width of the part corresponding to the overlapping part 108, that is, the width of the second metal layer 103 at the position corresponding to the overlapping part 108 is increased. This arrangement can avoid the problem of short circuit caused by the residue of the first metal layer 102.

For example, as illustrated by FIGS. 7 and 8, the bridge electrode 1031 and the connection electrode 1023 intersect to form four overlapping parts 108, and the four overlapping parts 108 are sequentially connected in a clockwise direction to form a quadrilateral shape, and the width of the bridge electrode 1031 at the vertex position of the quadrilateral shape is greater than the width of the part corresponding to the bridge electrode 1031 at other positions of the quadrilateral shape.

For example, as illustrated by FIG. 7, the first bridge electrode 1031*a* and the first connection electrode 1023*a* intersect to form a plurality of first overlapping parts 1081, and a width of the fourth metal line 1033 between adjacent first overlapping parts 1081 is smaller than the width of the fourth metal line 1033 corresponding to the first overlapping parts 1081. For example, a width of the part corresponding to the first bridge electrode 1031*a* between adjacent first overlapping parts 1081 (e.g., M and Q) is smaller than a width of the part corresponding to the first overlapping part 1081, that is, the width of the second metal layer 103 at the position corresponding to the first overlapping part 1081 is increased. This arrangement can avoid the problem of short circuit caused by the residue of the first metal layer 102.

For example, as illustrated by FIG. 7, the first bridge electrode 1031*a* and the first connection electrode 1023*a* intersect to form four first overlapping parts 1081, and the four first overlapping parts 1081 are sequentially connected in a clockwise direction to form a fifth quadrilateral shape MNPQ, and a width of the fourth metal line 1033 at the vertex position of the fifth quadrilateral shape MNPQ is greater than the width of other positions of the corresponding fourth metal line 1033 of the fifth quadrilateral shape MNPQ. That is, the width of the first bridge electrode 1031*a* at positions corresponding to the four vertices M, N, P and Q of the fifth quadrilateral shape MNPQ is greater than the width of the first bridge electrode 1031*a* at positions corresponding to the two opposite edges of the fifth quadrilateral shape MNPQ except for the four vertices M, N, P and Q. And in FIG. 7, the edge MQ and the edge NP correspond to the first bridge electrode 1031*a*, that is, the width at the position of the first bridge electrode 1031*a* corresponding to the four vertices M, N, P and Q of the fifth quadrilateral shape MNPQ is greater than the width at the position of the first bridge electrode 1031*a* corresponding to the edge MQ and the edge NP except for the four vertices M, N, P and Q.

For example, in FIG. 8, the second bridge electrode 1031*b* and the second connection electrode 1023*b* intersect to form a plurality of second overlapping parts 1082, and the width of the third metal line 1032 between adjacent second overlapping parts 1082 is smaller than the width of the third metal line 1032 corresponding to the second overlapping parts 1082. For example, the width of the part corresponding to the second bridge electrode 1031*b* between adjacent second overlapping parts 1082 (for example, M and Q) is smaller than that of the part corresponding to the second bridge electrode 1031*b* of the second overlapping part 1082, that is, the width of the second metal layer 103 at the position corresponding to the second overlapping part 1082 is increased. This arrangement can avoid the problem of short circuit caused by the residue of the first metal layer 102.

For example, as illustrated by FIG. 8, the second bridge electrode 1031*b* and the second connection electrode 1023*b* intersect to form four second overlapping parts 1082, and the four second overlapping parts 1082 are sequentially connected in a clockwise direction to form a sixth quadrilateral shape mnpq, and the width of the third metal line 1032 at the vertex position of the sixth quadrilateral shape mnpq is greater than the width of other positions of the corresponding third metal line 1032 of the sixth quadrilateral shape mnpq. That is, the width of the second bridge electrode 1031*b* at the position corresponding to the four vertices m, n, p and q of the sixth quadrilateral shape mnpq is greater than the width of the second bridge electrode 1031*b* at the position corresponding to the two opposite edges of the sixth quadrilateral shape mnpq except the four vertices m, n, p and q. And in FIG. 8, the edge mq and the edge np correspond to the second bridge electrode 1031*b*, that is, the width at the position of the second bridge electrode 1031*b* corresponding to the four vertices m, n, p and q of the sixth quadrilateral shape mnpq is greater than the width at the position of the second bridge electrode 1031*b* corresponding to the edge mq and the edge np except for the four vertices m, n, p and q.

Figure 9:
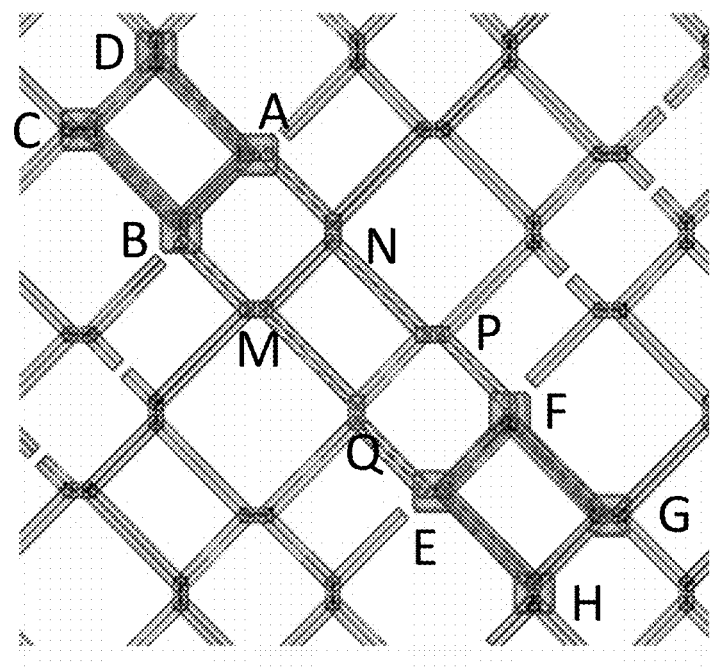
FIG. 9 is an enlarged structural diagram of a first bridge electrode, a first touch sub-electrode and a second touch sub-electrode provided by at least one embodiment of the present disclosure.

For example, FIG. 9 is an enlarged structural schematic diagram of a first bridge electrode, a first touch sub-electrode and a second touch sub-electrode provided by at least one embodiment of the present disclosure. As illustrated by FIG. 9, the first bridge electrode 1031*a* corresponding to the positions of the four edges AB, BC, CD and AD of the first quadrilateral shape ABCD and the vertices A, B, C and D all are a double-layer structure in which the first metal layer 102 and the second metal layer 103 are stacked. The first bridge electrode 1031*a* corresponding to the positions of the four edges EF, FG, GH, EH and the vertices E, F, G and H of the second quadrilateral shape EFGH all are a double-layer structure in which the first metal layer 102 and the second metal layer 103 are stacked.

For example, in combination with FIGS. 7, 8 and 9, the edge MN, the edge PQ, the edge MQ and the edge NP of the fifth quadrilateral shape MNPQ correspond to only one of the first metal layer 102 and the second metal layer 103 except for the positions of the four vertices M, N, P and Q. For example, in FIGS. 7, 8 and 9, both the edge MQ and the edge NP correspond to the second metal layer 103; both the edge MN and the edge PQ correspond to only the first metal layer 102. And the width of the second metal layer 103 at the positions of the vertices M, N, P and Q is greater than the width of the side MQ and the side NP except for the vertex positions.

For example, as illustrated by FIG. 9, in the quadrilateral shape ABMN, both the edge BM and the edge AN correspond to only the second metal layer 103. In the quadrilateral EFPQ, both the edge EQ and the edge FP correspond only to the second metal layer 103.

Figure 10:
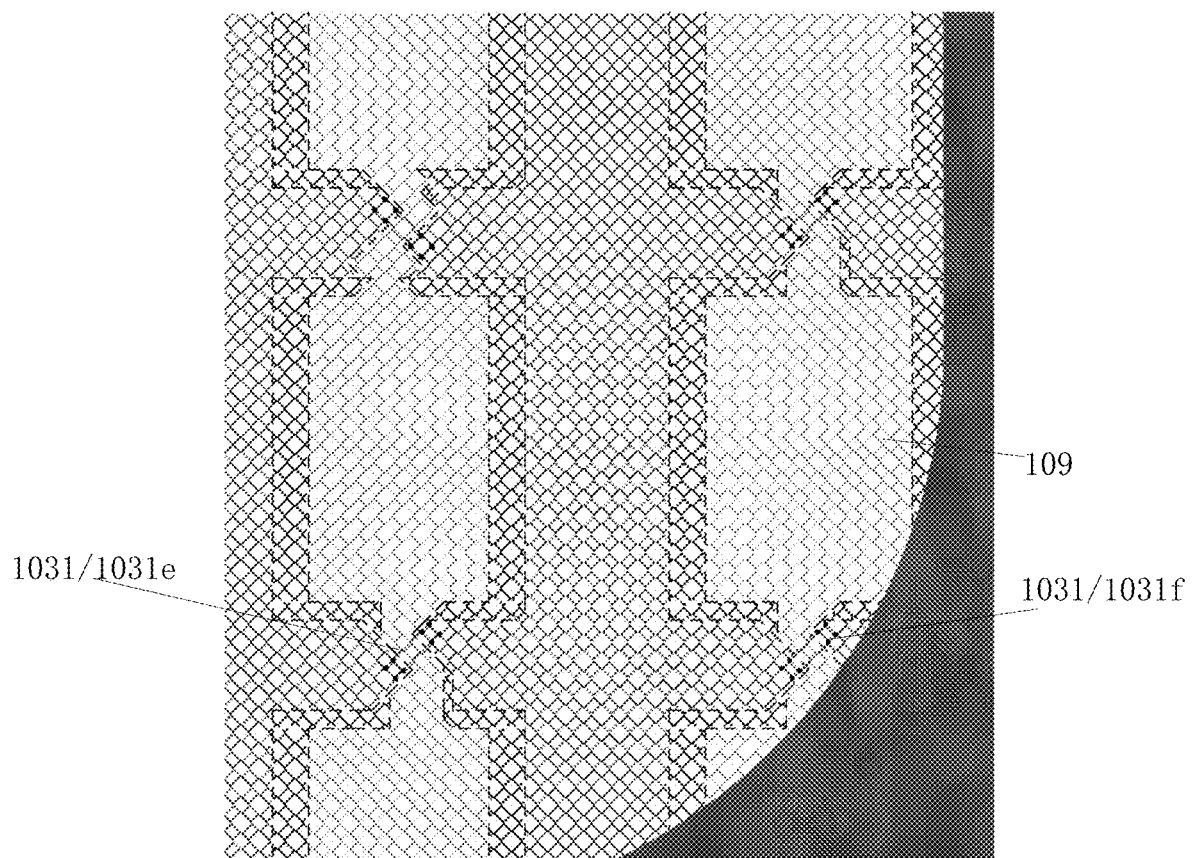
FIG. 10 is a schematic plan view of a touch control structure in a peripheral area provided by at least one embodiment of the present disclosure.

For example, FIG. 10 is a schematic plan view of the touch control structure in a peripheral area provided by at least one embodiment of the present disclosure. As illustrated by FIG. 10, the same side of the peripheral area 109 includes a plurality of bridge electrodes 1031, and the plurality of bridge electrodes 1031 include a third bridge electrode 1031*e* and a fourth bridge electrode 1031*f* which are adjacent to each other. And the extension directions of the third bridge electrode 1031*e* and the fourth bridge electrode 1031*f* are the same, so that jumper wires can be avoided at the edge position without affecting the pattern of the whole touch control structure, and additional noise can be avoided only by rotating a part of the bridge electrodes in the peripheral area, and the phenomenon of vanishing can also be prevented to a certain extent.

Figure 11:
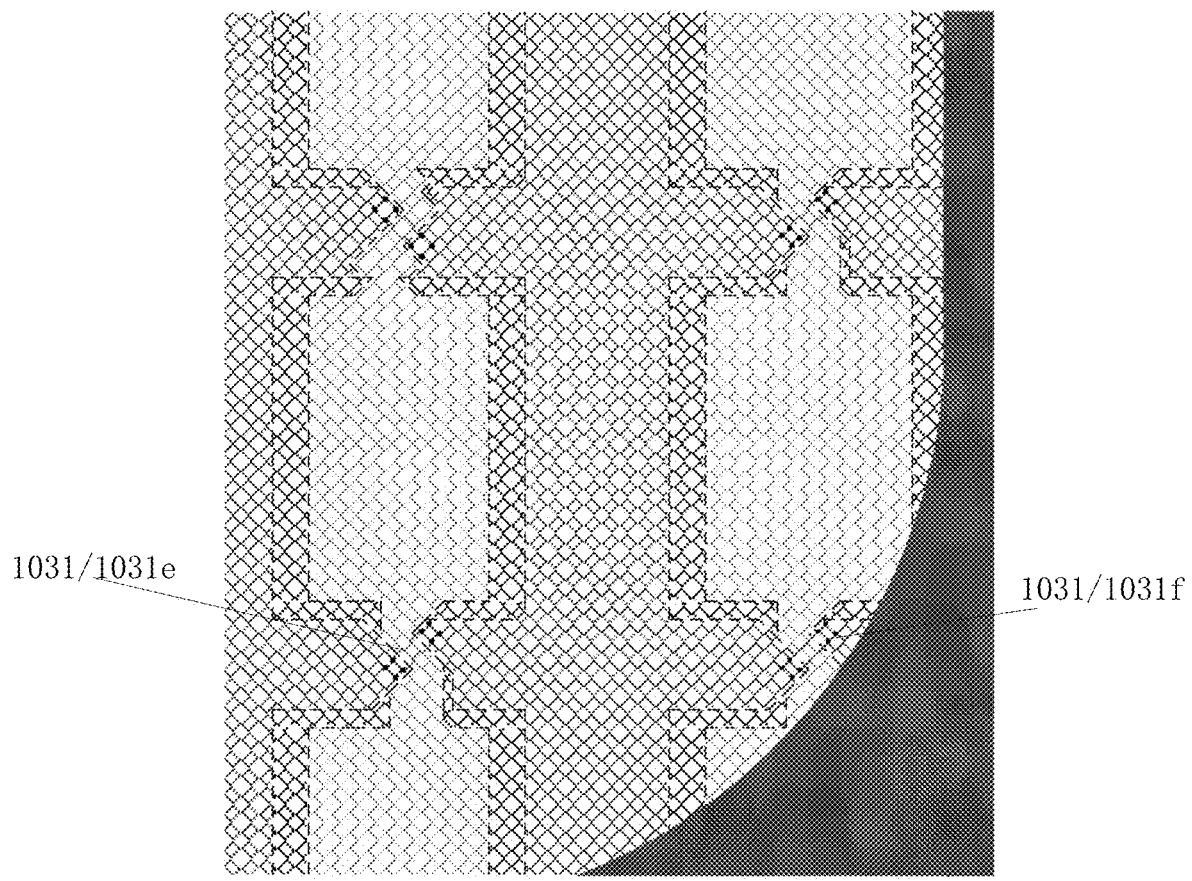
FIG. 11 is a schematic plan view of a touch control structure in a peripheral area provided by at least one embodiment of the present disclosure.

For example, FIG. 11 is a schematic plan view of the touch control structure in a peripheral area provided by at least one embodiment of the present disclosure. What is shown in FIG. 11 is that the peripheral area includes a bridge electrode 1031 at the same side of the peripheral area 109, which is a third bridge electrode 1031*e*, and the extension direction of the third bridge electrode 1031*e* is the same as that of the bridge electrode 1031 in the middle area 107 which is closest to the third bridge electrode 1031*e*. The bridge electrode which is closest to the third bridge electrode 1031*e* is the first bridge electrode or the second bridge electrode, which can also meet the requirement that jumper wires are not used at the edge position, that is, the jumper wires are avoided without affecting the pattern of the whole touch control structure, and additional noise can be avoided only by rotating a part of the bridge electrodes in the peripheral area, and the vanishing phenomenon can also be prevented to a certain extent.

Figure 12:
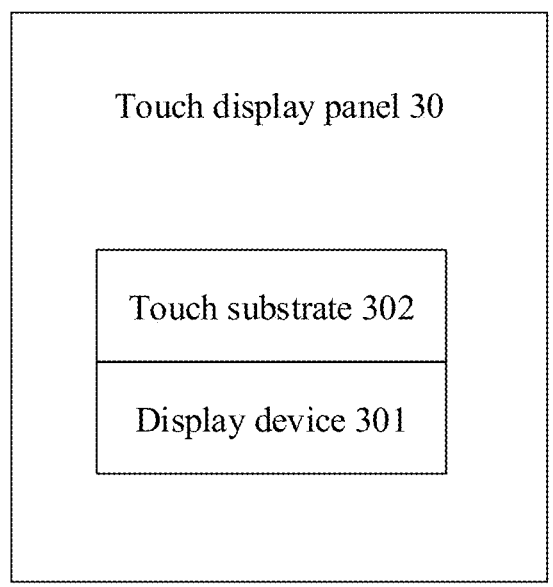
FIG. 12 is a schematic block diagram of a touch display panel provided by at least one embodiment of the present disclosure.

At least one embodiment of the present disclosure also provides a touch display panel, which includes a display structure stacked on a base substrate and the touch control structure in any one of the above embodiments. For example, FIG. 12 is a schematic block diagram of a touch display panel provided by at least one embodiment of the present disclosure. For example, as illustrated by FIG. 12, the touch display panel 30 includes a display device 301 and a touch substrate 302. For example, the display device 301 and the touch substrate 302 can be stacked. For example, the touch substrate 302 can be a touch control structure in any embodiment of the present disclosure.

For example, in at least one embodiment of the present disclosure, the touch display panel 30 may further include an encapsulation layer located between the display device 301 and the touch substrate 302, so as to avoid possible mutual interference between the display device 301 and functional structures or film materials in the touch substrate 302.

Figure 13:
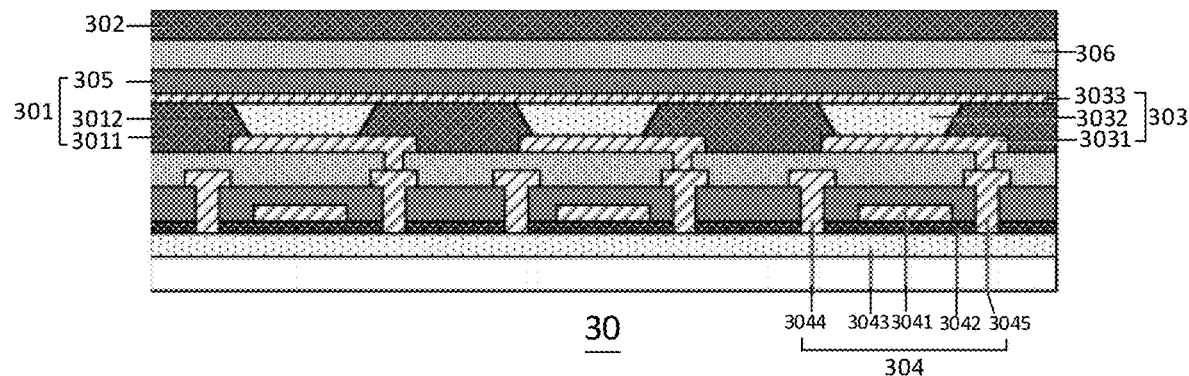
FIG. 13 is a schematic cross-sectional view of a touch display panel provided by at least one embodiment of the present disclosure.

For example, FIG. 13 is a schematic cross-sectional view of a touch display panel provided by at least one embodiment of the present disclosure. As illustrated by FIG. 13, the touch substrate 302 is located at a display side of the display device 301. For example, during use, the touch substrate 302 is closer to the user than the display device 301.

For example, the embodiment of the present disclosure takes the case that the touch display panel is an OLED touch display panel as an example. For example, the OLED touch display panel can be an On-cell touch display panel or an In-cell touch display panel. Of course, in other embodiments of the present disclosure, the touch display panel can also be a liquid crystal touch display panel, and the embodiments of the present disclosure do not limit the specific types of display panels using the touch substrate provided by the embodiments of the present disclosure.

For example, the display device 301 includes a plurality of sub-pixels arranged in an array. For example, the touch display panel 30 is an OLED touch display panel, and the plurality of sub-pixels may include green sub-pixels, red sub-pixels or blue sub-pixels. Each sub-pixel includes a light emitting element 303 and a pixel driving circuit that drives the light emitting element 303 to emit light. The embodiment of the present disclosure does not limit the types and specific compositions of the pixel driving circuit. For example, the pixel driving circuit can be current-driven or voltage-driven, can be 2T1C (i.e., two transistors and a capacitor, which include a driving transistor and a data writing transistor) driving circuit, and can further include a compensation circuit (compensation transistor), a light emission control circuit (light emission control transistor), a reset circuit (reset transistor) and the like on the basis of 2T1C.

Figure 14:
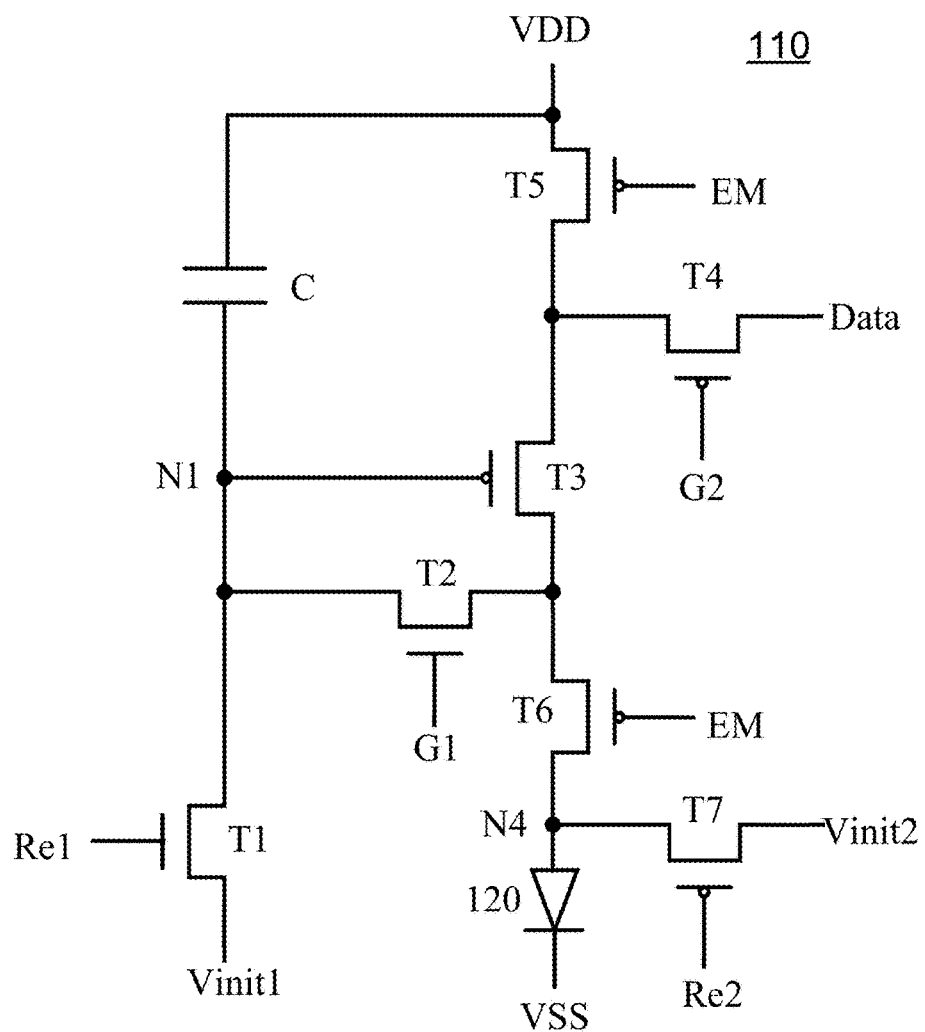
FIG. 14 is a schematic circuit structure diagram of a pixel circuit provided by at least one embodiment of the present disclosure.

For example, in one example, the pixel driving circuit is 7T1C. For example, FIG. 14 is a schematic circuit structure diagram of a pixel circuit provided by at least one embodiment of the present disclosure. As illustrated by FIG. 14, the pixel circuit 110 includes a first transistor T1, a second transistor T2, a driving transistor T3, a fourth transistor T4, a fifth transistor T5, a sixth transistor T6, a seventh transistor T7 and a storage capacitor C.

For example, as illustrated by FIG. 14, the first transistor T1 is a first reset transistor T1, the second transistor T2 is a threshold compensation transistor T2, the fourth transistor T4 is a data writing transistor T4, the fifth transistor T5 is a second light emission control transistor T5, the sixth transistor T6 is a first light emission control transistor T6, and the seventh transistor T7 is a second reset control transistor T7.

For example, a first electrode of the first transistor T1 is connected to a N1 node, that is, the first electrode of the first transistor T1 is electrically connected to a gate electrode of the driving transistor T3; a second electrode of the first transistor T1 is connected to a first initial signal terminal Vinit1, that is, the second electrode of the first transistor T1 is electrically connected to a first reset signal line to receive a reset signal, a gate electrode of the first transistor T1 is connected to a first reset signal terminal Re1, that is the gate electrode of the first transistor T1 is electrically connected to the reset control signal line to receive the reset control signal; a first electrode of the second transistor T2, that is, the first electrode of the threshold compensation transistor, is connected to the N1 node, that is, the first electrode of the second transistor T2 is electrically connected to the gate electrode of the driving transistor T3, and a second electrode of the second transistor T2 is connected to a first gate driving signal terminal G1 to receive a compensation control signal; a gate electrode of the driving transistor T3 is connected to the N1 node to be connected with a first plate of the storage capacitor C, the first electrode of the first transistor T1 and the first electrode of the second transistor T2. A first electrode of the fourth transistor T4, that is, the first electrode of the data writing transistor, is connected to a data signal terminal DATA to receive the data signal, a second electrode of the fourth transistor T4 is connected to the first electrode of the driving transistor T3, and a gate electrode of the fourth transistor T4 is connected to the second gate driving signal terminal G2 to receive the scanning signal; a first electrode of the fifth transistor T5, that is, the first electrode of the second light emission control transistor, is connected to a first power supply terminal VDD to receive the first power supply signal, a second electrode of the fifth transistor T5 is connected to the first electrode of the driving transistor T3, and a gate electrode of the fifth transistor T5 is connected to a light emission control signal terminal EM to receive the light emission control signal; a first electrode of the sixth transistor T6, that is, the first electrode of the first light emitting control transistor, is connected to the second electrode of the driving transistor T3, a second electrode of the sixth transistor T6 is connected to the first electrode of the seventh transistor T7, and a gate electrode of the sixth transistor T6 is connected to a light emitting control signal terminal EM to receive a light emitting control signal; a second electrode of the seventh transistor T7 is connected to a second initial signal terminal Vinit2, that is, electrically connected to the second reset power signal line to receive the reset signal Vinit, and a gate electrode of the seventh transistor T7 is connected to a second reset signal terminal Re2, that is, electrically connected to the reset control signal line to receive the reset control signal; the first plate of the storage capacitor C is connected to the N1 node and electrically connected to the gate electrode of the driving transistor T3, and the second plate of the storage capacitor C is connected to the first power supply terminal VDD, that is, the first power supply signal line. The pixel circuit can be connected with a light emitting element 120, which can be an organic light emitting diode (OLED), and the pixel circuit is used for driving the light emitting element 120 to emit light, and the light emitting element 120 can be connected between the second electrode of the sixth transistor T6 and the second power supply terminal VSS, that is, the second power supply signal line.

For example, the first power signal line refers to a signal line that outputs a voltage signal VDD, and can be connected with a voltage source to output a constant voltage signal, such as a positive voltage signal. The second power signal line refers to a signal line that outputs a voltage signal VSS, and can be connected with a voltage source to output a constant voltage signal, such as a negative voltage signal.

For example, the scanning signal and the compensation control signal may be the same, that is, the gate electrode of the data writing transistor T4 and the gate electrode of the threshold compensation transistor T2 may be electrically connected to the same signal line to receive the same signal, so as to reduce the number of signal lines. For example, the gate electrode of the data writing transistor T4 and the gate electrode of the threshold compensation transistor T2 can also be electrically connected to different signal lines respectively, that is, the gate electrode of the data writing transistor T4 is electrically connected to the second scanning signal line (second gate line), and the gate electrode of the threshold compensation transistor T2 is electrically connected to the first scanning signal line (first gate line), and the signals transmitted by the first scanning signal line and the second scanning signal line can be the same or different, so that the gate electrode of the data writing transistor T4 and the gate electrode of the threshold compensation transistor T2 can be separately and independently controlled, which can increase the flexibility of controlling pixel circuits.

For example, the first light emission control transistor T6 and the second light emission control transistor T5 may have the same light emission control signal input, that is, the gate electrode of the first light emission control transistor T6 and the gate electrode of the second light emission control transistor T5 may be electrically connected to the same signal line to receive the same signal, thereby reducing the number of signal lines. For example, the gate electrodes of the first light emitting control transistor T6 and the second light emitting control transistor T5 may be electrically connected to different light emitting control signal lines, respectively. In this case, the signals transmitted by different light emitting control signal lines may be the same or different.

For example, the reset control signals input to the second reset transistor T7 and the first reset transistor T1 may be the same, that is, the gate electrode of the second reset transistor T7 and the gate electrode of the first reset transistor T1 may be electrically connected to the same signal line to receive the same signal, thereby reducing the number of signal lines. For example, the gate electrode of the second reset transistor T7 and the gate electrode of the first reset transistor T1 may be electrically connected to different reset control signal lines, respectively, in which case the signals on different reset control signal lines may be the same or different.

For example, the first transistor T1 and the second transistor T2 may be N-type transistors. For example, the first transistor T1 and the second transistor T2 can be N-type metal oxide transistors, and the N-type metal oxide transistors have smaller leakage current, so that the phenomenon that the N1 node leaks electricity through the first transistor T1 and the second transistor T2 in the light emitting stage can be avoided. Meanwhile, the driving transistor T3, the fourth transistor T4, the fifth transistor T5, the sixth transistor T6, and the seventh transistor T7 can be P-type transistors, for example, the driving transistor T3, the fourth transistor T4, the fifth transistor T5, the sixth transistor T6, and the seventh transistor T7 can be P-type low-temperature polycrystalline silicon transistors, and the P-type low-temperature polycrystalline silicon transistors have higher carrier mobility, which is beneficial for achieving display panels with high resolution, high reaction speed, high pixel density, and high opening rate, and the like. The first initial signal terminal Vinit1 and the second initial signal terminal Vinit2 can output the same or different voltage signals according to the actual situation.

For the sake of clarity, FIG. 13 shows a thin film transistor 304 directly electrically connected to the light emitting element 303 in the pixel driving circuit. The thin film transistor 304 can be a driving transistor, and is configured to work in a saturated state and control the magnitude of current driving the light emitting element 303 to emit light. For example, the thin film transistor 304 may also be a light emission control transistor for controlling whether the current driving the light emitting element 303 to emit light flows. Embodiments of the present disclosure do not limit the specific types of thin film transistors.

For example, the light emitting element 303 is an organic light emitting diode and includes a first electrode 3031, a light emitting layer 3032 and a second electrode 3033. One of the first electrode 3031 and the second electrode 3033 is an anode and the other is a cathode. For example, the first electrode 3031 is an anode and the second electrode 3033 is a cathode. For example, the light emitting layer 3032 is an organic light emitting layer or a quantum dot light emitting layer. For example, the light emitting element 303 may include auxiliary functional layers such as a hole injection layer, a hole transport layer, an electron injection layer and an electron transport layer in addition to the light emitting layer 3032. For example, the light emitting element 303 may have a top emission structure, and the first electrode 3031 is reflective and the second electrode 3033 is transmissive or semi-transmissive. For example, the first electrode 3031 is a material with high work function to act as an anode, such as ITO/Ag/ITO laminated structure; The second electrode 3033 is a material with a low work function to act as a cathode, for example, a semi-transparent metal or a metal alloy material, for example, an Ag/Mg alloy material.

For example, the thin film transistor 304 includes a gate electrode 3041, a gate insulating layer 3042, an active layer 3043, a first source-drain electrode 3044, and a second source-drain electrode 3045, which is electrically connected to the first electrode 3031 of the light emitting element 303. The embodiment of the present disclosure does not limit the type, material, structure, etc. of the thin film transistor 304, for example, it may be a top gate type, a bottom gate type, etc. For example, the active layer 3043 of the thin film transistor 304 may be amorphous silicon, polysilicon (low temperature polysilicon and high temperature polysilicon), oxide semiconductor (for example, indium gallium tin oxide (IGZO)) and the like. For example, the thin film transistor 304 may be an N-type transistor or a P-type transistor.

Transistors (for example, the thin film transistor 304) used in the embodiments of the present disclosure can be thin film transistors, field effect transistors or other switching devices with the same characteristics, the embodiments of the present disclosure are illustrated by using the transistors as thin film transistors as examples. The source electrode and the drain electrode of the transistor adopted by the embodiment of the present disclosure may be symmetrical in structure, so there may be no difference in structure between the source electrode and the drain electrode. In the embodiment of the present disclosure, in order to distinguish the two electrodes of the transistor except the gate electrode, one of the source electrode and the drain electrode is directly described as the first source-drain electrode and the other as the second source-drain electrode.

For example, as illustrated by FIG. 13, the display device 301 further includes a pixel defining layer 3011 disposed on the first electrode 3031 of the light emitting element 303, in which a plurality of openings 3012 are formed to expose the first electrodes 3031 of a plurality of sub-pixels respectively, thereby defining a pixel opening area of each sub-pixel, in which the light emitting layer of the sub-pixel is formed, and the second electrode 3033 can be a common electrode, that is, a plurality of sub pixels share a common electrode.

For example, as illustrated by FIG. 13, the display device 301 further includes an encapsulation layer 305 located between the light emitting element 303 and the touch substrate 302, and the encapsulation layer 305 is configured to seal the light emitting element 303, so as to prevent external moisture and oxygen from penetrating into the light emitting element 303 and the driving circuit to cause damage to devices such as the light emitting element 303. For example, the encapsulation layer 305 may be a single-layer structure or a multi-layer structure. For example, the encapsulation layer 305 includes an organic thin film, an inorganic thin film, or a multilayer structure including organic thin films and inorganic thin films alternately stacked. In the case that the encapsulation layer 305 includes a multilayer structure in which organic films and inorganic films are alternately stacked, it can better prevent external water vapor from penetrating into the inside of the light emitting element.

For example, as illustrated by FIG. 13, the touch display panel 30 further includes a buffer layer 306 located between the display device 301 and the touch substrate 302. For example, the buffer layer 306 is formed on the packaging layer 305 to improve the adhesion between the touch substrate 302 and the display device 301. For example, the buffer layer 306 may be an inorganic insulating layer. For example, the material of the buffer layer 306 can be silicon nitride, silicon oxide or silicon oxynitride. For example, the buffer layer 306 may also include a structure in which silicon oxide layers and silicon nitride layers are alternately stacked.

It should be noted that in a flexible multi-layer on cell (FMLOC), the base substrate can also be used as a buffer layer without a special buffer layer.

For example, the touch display panel 30 provided by the embodiment of the present disclosure has both a touch function and a display function, and has all the technical effects of the touch substrate provided by the above embodiment of the present disclosure, so the technical effects of the touch display panel are not repeated herein.

At least one embodiment of the present disclosure also provides an electronic device, which includes the touch control structure or the touch display panel provided by any embodiment of the present disclosure, for example, the electronic device may include the touch display panel 30.

Figure 15:
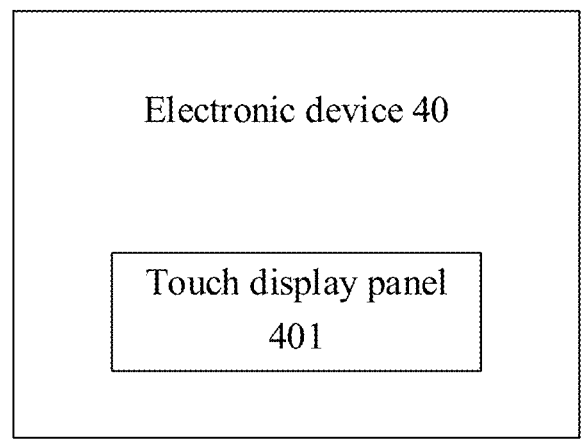
FIG. 15 is a schematic block diagram of an electronic device provided by at least one embodiment of the present disclosure.

For example, FIG. 15 is a schematic block diagram of an electronic device provided by at least one embodiment of the present disclosure. For example, as illustrated by FIG. 15, the electronic device 40 includes a touch display panel 401. For example, the touch display panel 401 can be the touch display panel 30 provided by any embodiment of the present disclosure. For example, the touch display panel 30 includes the touch control structure 100 in any one of the above embodiments.

For example, the electronic device 40 may be a display device or a display device with a display function and a touch function. For example, the electronic device 40 may be an OLED display device, a QLED display device or a liquid crystal display device, which is not limited by the embodiment of the present disclosure.

For example, the electronic device 40 can be a display, an OLED display panel, an OLED TV, a liquid crystal display panel, a liquid crystal display TV, a QLED display panel, a QLED TV, an electronic paper, a mobile phone, a tablet computer, a notebook computer, a digital photo frame, a navigator and other products or components with display function and touch function.

The touch control structure, the touch display panel and the electronic device provided by at least one embodiment of the present disclosure have at least one beneficial technical effect:

(1) In the touch control structure provided by at least one embodiment of the present disclosure, at least in the middle area, the plurality of bridge electrodes include a first bridge electrode and a second bridge electrode which are adjacent to each other, and the first bridge electrode and the second bridge electrode which are adjacent in the first direction are symmetrical about a straight line extending in the second direction, and the first bridge electrode and the second bridge electrode which are adjacent in the second direction are symmetrical about a straight line extending in the first direction. And the extension directions of the first bridge electrode and the second bridge electrode which are adjacent to each other intersect, so that the ratio of the mutual capacitance change $\Delta Cm$ before and after finger touch to the capacitance Cm between the first touch electrode (touch driving electrode Tx) and the second touch electrode (touch sensing electrode Rx) can be improved, and the phenomenon of vanishing can be prevented.

(2) In the touch control structure provided by at least one embodiment of the present disclosure, jumper wires are not used at the edge positions, that is, jumper wires are avoided without affecting the pattern of the whole touch control structure, and additional noise can be avoided only by rotating a part of the bridge electrodes in the peripheral area, and the phenomenon of vanishing can also be prevented to a certain extent.

(3) The touch control structure provided by at least one embodiment of the present disclosure can disconnect some metal lines or design them wider and narrower to prevent short circuit between the first metal layer and the second metal layer.

The following points need to be explained:

(1) The drawings of the embodiment of this disclosure only relate to the structure related to the embodiment of this disclosure, and other structures can refer to the general design.

(2) For the sake of clarity, in the drawings used to describe the embodiments of the present disclosure, the thickness of layers or regions is enlarged or reduced, that is, these drawings are not drawn to actual scale.

(3) In the case of no conflict, the embodiments of the present disclosure and the features in the embodiments can be combined with each other to obtain a new embodiment.

The above is only the specific implementation of this disclosure, but the scope of protection of this disclosure is not limited to this, and the scope of protection of this disclosure should be subject to the scope of protection of the claims.

The invention claimed is:

1. A touch control structure, comprising:
a base substrate; and
a first metal layer and a second metal layer stacked on the base substrate, and an insulating layer sandwiched between the first metal layer and the second metal layer, wherein the first metal layer comprises a plurality of first touch sub-electrodes sequentially arranged along a first direction and spaced apart from each other, and a plurality of second touch sub-electrodes and a plurality of connection electrodes which are sequentially arranged along a second direction, the first direction intersects with the second direction, and the plurality of first touch sub-electrodes and the plurality of second touch sub-electrodes are spaced apart from each other;
the second metal layer comprises a plurality of bridge electrodes spaced apart from each other, and each of the plurality of bridge electrodes is electrically connected with two adjacent first touch sub-electrodes through a plurality of via structures in the insulating layer, so as to electrically connect any adjacent first touch sub-electrodes to form a first touch electrode extending in the first direction;
the plurality of second touch sub-electrodes and the plurality of connection electrodes are alternately arranged one by one and electrically connected in sequence to form a second touch electrode extending along the second direction;
an orthographic projection of each of the plurality of bridge electrodes on the base substrate is overlapped with an orthographic projection of a corresponding connection electrode on the base substrate;

on a plane parallel to a main surface of the base substrate, the touch control structure is divided into a middle area and a peripheral area surrounding the middle area, at least in the middle area, the plurality of bridge electrodes comprise a first bridge electrode and a second bridge electrode which are adjacent to each other, and the two adjacent first touch sub-electrodes connected with the first bridge electrode are a first group of touch sub-electrodes, the two adjacent first touch sub-electrodes connected with the second bridge electrode are a second group of touch sub-electrodes, the first group of touch sub-electrodes and the second group of touch sub-electrodes are different touch sub-electrodes, and extension directions of the first bridge electrode and the second bridge electrode which are adjacent to each other intersect with each other;

the plurality of via structures comprise four groups of first via structures and second via structures which are oppositely arranged in the extension direction of each of the plurality of bridge electrodes;

the first metal layer comprises a plurality of first metal grids defined by a plurality of first metal lines and a plurality of second metal lines intersecting with each other;

in the middle area, the extension directions of the plurality of first metal lines in the first metal layer are all parallel to the extension direction of the second bridge electrode, and the extension directions of the plurality of second metal lines in the first metal layer are all parallel to the extension direction of the first bridge electrode;

four first via structures at the first side of the first bridge electrode in the extension direction of the first bridge electrode are connected in sequence to form a first quadrilateral shape, and the first quadrilateral shape is at an edge position of a corresponding first touch sub-electrode;

the plurality of connection electrodes comprise a first connection electrode corresponding to and intersecting with the first bridge electrode, the first quadrilateral shape comprises a first edge and a second edge which are connected with each other, the first quadrilateral shape comprises one first edge and two second edges, and the first edge is formed by connecting two first via structures which are closest to the first connection electrode among the four first via structures at the first side, the first edge is parallel to the extension directions of the plurality of first metal lines, the two second edges are two edges connected with the first edge, the second edge is parallel to the extension directions of the plurality of second metal lines, and the first metal line corresponding to the first edge is disconnected at both ends; and/or four first via structures at the first side of the second bridge electrode in the extension direction of the second bridge electrode are connected in sequence to form a third quadrilateral shape, and the third quadrilateral shape is at an edge position of a corresponding first touch sub-electrode;

the plurality of connection electrodes comprise a second connection electrode corresponding to and intersecting with the second bridge electrode, the third quadrilateral shape comprises a fifth edge and a sixth edge which are connected with each other, the third quadrilateral shape comprises one fifth edge and two sixth edges, and the fifth edge is formed by connecting two first via structures which are closest to the second connection electrode among the four first via structures at the first side, the fifth edge is parallel to the extension directions of the plurality of second metal lines, the two sixth edges are two edges connected with the fifth edge, the sixth edge is parallel to the extension directions of the plurality of first metal lines, and the second metal line corresponding to the fifth edge is disconnected at both ends.

2. The touch control structure according to claim 1, wherein the first bridge electrode and the second bridge electrode which are adjacent in the first direction are symmetrical about a straight line extending in the second direction.

3. The touch control structure according to claim 2, wherein the first bridge electrode and the second bridge electrode which are adjacent in the second direction are symmetrical about a straight line extending in the first direction.

4. The touch control structure according to claim 3, wherein an extension direction of each of the plurality of bridge electrodes is perpendicular to an extension direction of a corresponding connection electrode.

5. The touch control structure according to claim 4, wherein, in the middle area, the extension directions of the first bridge electrode and the second bridge electrode which are adjacent to each other are perpendicular to each other.

6. The touch control structure according to claim 1, wherein, each of the plurality of first metal grids has a quadrilateral shape, and each of the plurality of first touch sub-electrodes comprises multiple first metal grids in the plurality of first metal grids and each of the second touch sub-electrodes comprises multiple first metal grids in the plurality of first metal grids;

in the middle area, extension directions of the plurality of first metal lines are all parallel to the extension direction of the first bridge electrode, and the extension directions of the plurality of second metal lines are all parallel to the extension direction of the second bridge electrode, or the extension directions of the first metal lines are all parallel to the extension direction of the second bridge electrode, and the extension directions of the plurality of second metal lines are all parallel to the extension direction of the first bridge electrode.

7. The touch control structure according to claim 6, wherein, the plurality of via structures comprise a first via structure and a second via structure which are oppositely arranged in the extension direction of each of the plurality of bridge electrodes; the first touch sub-electrode located at a first end of each of the plurality of bridge electrodes is electrically connected with a corresponding bridge electrode through the first via structure, and the first touch sub-electrode located at a second end of each of the plurality of bridge electrodes is electrically connected with the corresponding bridge electrode through the second via structure, and the first end and the second end of each of the plurality of bridge electrodes are opposite ends along the extension direction of the corresponding bridge electrode, such that the first touch sub-electrode located at the first end of each of the plurality of bridge electrodes and the first touch sub-electrode located at the second end of the corresponding bridge electrode are electrically connected.

8. The touch control structure according to claim 7, wherein, each of the plurality of bridge electrodes comprises a first part and a second part which extend in parallel and are spaced apart from each other, and both the first part and the second part are electrically connected with the first touch sub-electrode at the first end of the corresponding bridge electrode through the first via structures, and both the first part and the second part are electrically connected with the first touch sub-electrode at the second end of the corresponding bridge electrode through the second via structures.

9. The touch control structure according to claim 8, wherein,
both the first part and the second part are electrically connected with the first touch sub-electrode at the first end of the corresponding bridge electrode through two corresponding first via structures;
both the first part and the second part are electrically connected with the first touch sub-electrode at the second end of the corresponding bridge electrode through two corresponding second via structures.

10. The touch control structure according to claim 8, wherein the orthographic projection of each of the plurality of bridge electrodes on the base substrate is partially overlapped with orthographic projections of the first touch sub-electrodes connected to both ends of each of the plurality of bridge electrode on the base substrate.

11. The touch control structure according to claim 1, wherein,
four second via structures at the second side of the first bridge electrode in the extension direction of the first bridge electrode are connected in sequence to form a second quadrilateral shape, the first side and the second side are two opposite sides in the extension direction of the first bridge electrode, and the second quadrilateral shape is at an edge position of a corresponding first touch sub-electrode;
the second quadrilateral shape comprises a third edge and a fourth edge which are connected with each other, the second quadrilateral shape comprises one third edge and two fourth edges, and the third edge is formed by connecting two second via structures which are closest to the first connection electrode among the four second via structures at the second side; the third edge is parallel to the extension directions of the plurality of first metal lines, and the two fourth sides are two edges connected with the third edge, the fourth edge is parallel to the extension directions of the plurality of second metal lines, and the first metal line corresponding to the third edge is disconnected at both ends, and/or
four second via structures at the second side of the second bridge electrode in the extension direction of the second bridge electrode are connected in sequence to form a fourth quadrilateral shape, the first side and the second side are two opposite sides in the extension direction of the second bridge electrode, and the fourth quadrilateral shape is at an edge position of a corresponding first touch sub-electrode;
the fourth quadrilateral shape comprises a seventh edge and an eighth edge which are connected with each other, the fourth quadrilateral shape comprises one seventh edge and two eighth edges, and the seventh edge is formed by connecting two second via structures which are closest to the second connection electrode among the four second via structures at the second side, the seventh edge is parallel to the extension directions of the plurality of second metal lines, and the two eighth edges are two edges connected with the seventh edge, the eighth edge is parallel to the extension directions of the plurality of first metal lines, and the second metal line corresponding to the seventh edge is disconnected at both ends.

12. The touch control structure according to claim 11, wherein,
the second metal layer comprises a plurality of second metal grids defined by a plurality of third metal lines and a plurality of fourth metal lines intersecting with each other, extension directions of the plurality of third metal lines are parallel to the extension directions of the plurality of first metal lines, and the extension directions of the plurality of fourth metal lines are parallel to the extension directions of the plurality of second metal lines, and each of the plurality of second metal grids has a quadrilateral shape.

13. The touch control structure according to claim 12, wherein a width of a first metal line corresponding to the first edge and the third edge in the extension direction of the first bridge electrode is equal to a width of other positions of the first metal line in the extension direction of the first bridge electrode; a width of a third metal line corresponding to the first edge and the third edge in the extension direction of the first bridge electrode is equal to a width of other positions of the third metal line in the extension direction of the first bridge electrode, and an edge of the first metal line corresponding to the first edge at a side close to a center of the first quadrilateral shape is closer to the center of the first quadrilateral shape than an edge of the third metal line corresponding to the first edge at a side close to the center of the first quadrilateral shape, and an orthographic projection of the first metal line corresponding to the first edge on the base substrate and an orthographic projection of the third metal line corresponding to the first edge on the base substrate are at least partially not overlapped with each other; an edge of the first metal line corresponding to the third edge at a side close to a center of the second quadrilateral is closer to the center of the second quadrilateral than an edge of the third metal line corresponding to the third edge at a side close to the center of the second quadrilateral, and an orthographic projection of the first metal line corresponding to the third edge on the base substrate and an orthographic projection of the third metal line corresponding to the third edge on the base substrate are at least partially not overlapped with each other; and/or
a width of a second metal line corresponding to the fifth edge and the seventh edge in the extension direction of the second bridge electrode is equal to a width of other positions of the second metal line in the extension direction of the second bridge electrode; a width of a fourth metal line corresponding to the fifth edge and the seventh edge in the extension direction of the second bridge electrode is equal to a width of other positions of the fourth metal line in the extension direction of the second bridge electrode, and an edge of the second metal line corresponding to the fifth edge at a side close to a center of the third quadrilateral shape is closer to the center of the third quadrilateral shape than an edge of the fourth metal line corresponding to the fifth edge at a side close to the center of the third quadrilateral shape, and an orthographic projection of the second metal line corresponding to the fifth edge on the base substrate and an orthographic projection of the fourth metal line corresponding to the fifth edge on the base substrate are at least partially not overlapped with each other; an edge of the second metal line corresponding to the seventh edge at a side close to a center of the fourth quadrilateral shape is closer to the center of the fourth quadrilateral shape than an edge of the fourth metal line corresponding to the seventh edge at a side close to the center of the fourth quadrilateral shape, and an orthographic projection of the second metal line corresponding to the seventh edge on the base substrate and an orthographic projection of the fourth metal line corresponding to the seventh edge on the base substrate are at least partially not overlapped with each other.

14. The touch control structure according to claim 13, wherein,
on the plane parallel to the main surface of the base substrate and in the extension direction of the first bridge electrode, a distance between the edge of the first metal line at a side close to the center of the first quadrilateral shape corresponding to the first edge and the edge of the third metal line at a side close to the center of the first quadrilateral shape corresponding to the first edge ranges from 1 µm to 1.4 µm;
in the extension direction of the first bridge electrode, a distance between the edge of the first metal line at a side close to the center of the second quadrilateral shape corresponding to the third edge and the edge of the third metal line at a side close to the center of the second quadrilateral shape corresponding to the third edge ranges from 1 µm to 1.4 µm; and/or
on the plane parallel to the main surface of the base substrate and in the extension direction of the second bridge electrode, a distance between the edge of the second metal line at a side close to the center of the third quadrilateral shape corresponding to the fifth edge and the edge of the fourth metal line at a side close to the center of the third quadrilateral shape corresponding to the fifth edge ranges from 1 µm to 1.4 µm;
in the extension direction of the second bridge electrode, a distance between the edge of the second metal line at a side close to the center of the fourth quadrilateral shape corresponding to the seventh edge and the edge of the fourth metal line at a side close to the center of the fourth quadrilateral shape corresponding to the seventh edge ranges from 1 µm to 1.4 µm.

15. The touch control structure according to claim 12, wherein a width of the second metal line corresponding to the second edge and the fourth edge in the extension direction of the first connection electrode intersecting with the first bridge electrode is equal to a width of other positions of the second metal line in the extension direction of the first connection electrode; a width of the fourth metal line corresponding to the second edge and the fourth edge in the extension direction of the first connection electrode intersecting with the first bridge electrode is equal to a width of other positions of the fourth metal line in the extension direction of the first connection electrode, and an edge of the second metal line corresponding to the second edge at a side close to a center of the first quadrilateral shape is closer to the center of the first quadrilateral shape than an edge of the fourth metal line corresponding to the second edge at a side close to the center of the first quadrilateral shape, and an orthographic projection of the second metal line corresponding to the second edge on the base substrate and an orthographic projection of the fourth metal line corresponding to the second edge on the base substrate are at least partially not overlapped with each other; an edge of the second metal line corresponding to the fourth edge at a side close to a center of the second quadrilateral shape is closer to the center of the second quadrilateral shape than an edge of the fourth metal line corresponding to the fourth edge at a side close to the center of the second quadrilateral shape, and an orthographic projection of the second metal line corresponding to the fourth edge on the base substrate and an orthographic projection of the fourth metal line corresponding to the fourth edge on the base substrate are at least partially not overlapped with each other, and/or
a width of the first metal line corresponding to the sixth edge and the eighth edge in the extension direction of the second connection electrode intersecting with the second bridge electrode is equal to a width of other positions of the first metal line in the extension direction of the second connection electrode; a width of the third metal line corresponding to the sixth edge and the eighth edge in the extension direction of the second connection electrode intersecting with the second bridge electrode is equal to a width of other positions of the third metal line in the extension direction of the second connection electrode, and an edge of the first metal line corresponding to the sixth edge at a side close to a center of the third quadrilateral shape is closer to the center of the third quadrilateral shape than an edge of the third metal line corresponding to the sixth edge at a side close to the center of the third quadrilateral shape, and an orthographic projection of the first metal line corresponding to the sixth edge on the base substrate and an orthographic projection of the third metal line corresponding to the sixth edge on the base substrate are at least partially not overlapped with each other; an edge of the first metal line corresponding to the eighth edge at a side close to a center of the fourth quadrilateral shape is closer to the center of the fourth quadrilateral shape than an edge of the third metal line corresponding to the eighth edge at a side close to the center of the fourth quadrilateral shape, and an orthographic projection of the first metal line corresponding to the eighth edge on the base substrate and an orthographic projection of the third metal line corresponding to the eighth edge on the base substrate are at least partially not overlapped with each other.

16. The touch control structure according to claim 15, wherein,
on the plane parallel to the main surface of the base substrate, a distance between the edge of the second metal line corresponding to the second edge at a side close to the center of the first quadrilateral shape and the edge of the fourth metal line corresponding to the second edge at a side close to the center of the first quadrilateral shape in the extension direction of the first connection electrode ranges from 1 µm to 1.4 µm;
a distance between the edge of the second metal line corresponding to the fourth edge at a side close to the center of the second quadrilateral shape and the edge of the fourth metal line corresponding to the fourth edge at a side close to the center of the second quadrilateral shape in the extension direction of the first connection electrode ranges from 1 µm to 1.4 µm; and/or
on the plane parallel to the main surface of the base substrate, a distance between the edge of the first metal line corresponding to the sixth edge close to the center of the third quadrilateral shape and the edge of the third metal line corresponding to the sixth edge at a side close to the center of the third quadrilateral shape in the extension direction of the second connection electrode ranges from 1 µm to 1.4 µm;
a distance between the edge of the first metal line corresponding to the eighth edge at a side close to the center of the fourth quadrilateral shape and the edge of the third metal line corresponding to the eighth edge at a side close to the center of the fourth quadrilateral shape in the extension direction of the second connection electrode ranges from 1 μm to 1.4 μm.

17. The touch control structure according to claim 11, wherein the first bridge electrode and the first connection electrode intersect to form four first overlapping parts, and the four first overlapping parts are sequentially connected in a clockwise direction to form a fifth quadrilateral shape; and/or
the second bridge electrode and the second connection electrode intersect to form four second overlapping parts, and the four second overlapping parts are sequentially connected in a clockwise direction to form a sixth quadrilateral shape.

18. The touch control structure according to claim 17, wherein at a position corresponding to each of the first overlapping parts, an orthographic projection of a part corresponding to the first metal layer on the base substrate is smaller than an orthographic projection of a part corresponding to the second metal layer on the base substrate, and the orthographic projection of the part corresponding to the first metal layer on the base substrate is within the orthographic projection of the part corresponding to the second metal layer on the base substrate; and/or
at a position corresponding to each of the second overlapping parts, an orthographic projection of a part corresponding to the first metal layer on the base substrate is smaller than an orthographic projection of a part corresponding to the second metal layer on the base substrate, and the orthographic projection of the part corresponding to the first metal layer on the base substrate is within the orthographic projection of the part corresponding to the second metal layer on the base substrate.

19. A touch control structure comprising:
a base substrate;
a first metal layer and a second metal layer stacked on the base substrate, and an insulating layer sandwiched between the first metal layer and the second metal layer,
wherein the first metal layer comprises a plurality of first touch sub-electrodes sequentially arranged along a first direction and spaced apart from each other, and a plurality of second touch sub-electrodes and a plurality of connection electrodes which are sequentially arranged along a second direction, the first direction intersects with the second direction and the plurality of first touch sub-electrodes and the plurality of second touch sub-electrodes are spaced apart from each other;
the second metal layer comprises a plurality of bridge electrodes spaced apart from each other, and each of the plurality of bridge electrodes is electrically connected with two adjacent first touch sub-electrodes through a plurality of via structures in the insulating layer, so as to electrically connect any adjacent first touch sub-electrodes to form a first touch electrode extending in the first direction;
the plurality of second touch sub-electrodes and the plurality of connection electrodes are alternately arranged one by one and electrically connected in sequence to form a second touch electrode extending along the second direction;
an orthographic projection of each of the plurality of bridge electrodes on the base substrate is overlapped with an orthographic projection of a corresponding connection electrode on the base substrate;

on a plane parallel to the main surface of the base substrate, the touch control structure is divided into a middle area and a peripheral area surrounding the middle area, at least in the middle area, the plurality of bridge electrodes comprise a first bridge electrode and a second bridge electrode which are adjacent to each other, and the two adjacent first touch sub-electrodes connected with the first bridge electrode are a first group of touch sub-electrodes, the two adjacent first touch sub-electrodes connected with the second bridge electrode are a second group of touch sub-electrodes, the first group of touch sub-electrodes and the second group of touch sub-electrodes are different touch sub-electrodes, a same side of the peripheral area comprises one bridge electrode, the bridge electrode is a third bridge electrode, and extension directions of the first bridge electrode and the second bridge electrode which are adjacent to each other are different, and an extension direction of the third bridge electrode is the same as an extension direction of a bridge electrode which is closest to the third bridge electrode in the middle area;
the plurality of via structures comprise four groups of first via structures and second via structures which are oppositely arranged in the extension direction of each of the plurality of bridge electrodes;
the first metal layer comprises a plurality of first metal grids defined by a plurality of first metal lines and a plurality of second metal lines intersecting with each other;
in the middle area, the extension directions of the plurality of first metal lines in the first metal layer are all parallel to the extension direction of the second bridge electrode, and the extension directions of the plurality of second metal lines in the first metal layer are all parallel to the extension direction of the first bridge electrode;
four first via structures at the first side of the first bridge electrode in the extension direction of the first bridge electrode are connected in sequence to form a first quadrilateral shape, and the first quadrilateral shape is at an edge position of a corresponding first touch sub-electrode;
the plurality of connection electrodes comprise a first connection electrode corresponding to and intersecting with the first bridge electrode, the first quadrilateral shape comprises a first edge and a second edge which are connected with each other, the first quadrilateral shape comprises one first edge and two second edges, and the first edge is formed by connecting two first via structures which are closest to the first connection electrode among the four first via structures at the first side, the first edge is parallel to the extension directions of the plurality of first metal lines, the two second edges are two edges connected with the first edge, the second edge is parallel to the extension directions of the plurality of second metal lines, and the first metal line corresponding to the first edge is disconnected at both ends; and/or
four first via structures at the first side of the second bridge electrode in the extension direction of the second bridge electrode are connected in sequence to form a third quadrilateral shape, and the third quadrilateral shape is at an edge position of a corresponding first touch sub-electrode;
the plurality of connection electrodes comprise a second connection electrode corresponding to and intersecting with the second bridge electrode, the third quadrilateral shape comprises a fifth edge and a sixth edge which are connected with each other, the third quadrilateral shape comprises one fifth edge and two sixth edges, and the fifth edge is formed by connecting two first via structures which are closest to the second connection electrode among the four first via structures at the first side, the fifth edge is parallel to the extension directions of the plurality of second metal lines, the two sixth edges are two edges connected with the fifth edge, the sixth edge is parallel to the extension directions of the plurality of first metal lines, and the second metal line corresponding to the fifth edge is disconnected at both ends.

* * * * *

UNITED STATES PATENT AND TRADEMARK OFFICE
CERTIFICATE OF CORRECTION

| | | |
|---|---|---|
| PATENT NO. | : 12,436,653 B2 | Page 1 of 1 |
| APPLICATION NO. | : 18/558297 | |
| DATED | : October 7, 2025 | |
| INVENTOR(S) | : Tianci Chen et al. | |

It is certified that error appears in the above-identified patent and that said Letters Patent is hereby corrected as shown below:

On the Title Page

Assignees Item (73) Line 1, delete "CHENGDUU" and insert --CHENGDU--.

Signed and Sealed this
Ninth Day of December, 2025

John A. Squires
*Director of the United States Patent and Trademark Office*